United States Patent
Sasaki et al.

(10) Patent No.: US 8,433,478 B2
(45) Date of Patent: Apr. 30, 2013

(54) REAR WHEEL STEERING CONTROL DEVICE

(75) Inventors: Hitoshi Sasaki, Wako (JP); Takamichi Hinohara, Wako (JP); Yutaka Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/509,702

(22) PCT Filed: Nov. 12, 2010

(86) PCT No.: PCT/JP2010/070177
§ 371 (c)(1),
(2), (4) Date: May 14, 2012

(87) PCT Pub. No.: WO2011/059050
PCT Pub. Date: May 19, 2011

(65) Prior Publication Data
US 2012/0277956 A1   Nov. 1, 2012

(30) Foreign Application Priority Data
Nov. 16, 2009   (JP) .................. 2009-260808

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2006.01) | |

(52) U.S. Cl.
USPC .............................. 701/41; 340/465

(58) Field of Classification Search .................. 701/41; 340/465
See application file for complete search history.

(56) References Cited

U.S. PATENT DOCUMENTS

| | | | | |
|---|---|---|---|---|
| 4,625,822 | A * | 12/1986 | Nakamura et al. | 180/415 |
| 4,840,243 | A * | 6/1989 | Hirabayashi et al. | 180/415 |
| 4,884,647 | A * | 12/1989 | Mimuro et al. | 180/415 |
| 4,976,328 | A * | 12/1990 | Ohmura | 180/412 |
| 5,007,494 | A * | 4/1991 | Ohmura et al. | 180/445 |
| 5,105,899 | A * | 4/1992 | Mori et al. | 180/415 |
| 5,122,955 | A * | 6/1992 | Ishikawa et al. | 701/43 |
| 5,282,135 | A * | 1/1994 | Sato et al. | 701/43 |
| 5,283,740 | A * | 2/1994 | Sato et al. | 701/43 |
| 5,438,515 | A * | 8/1995 | Miichi et al. | 701/36 |
| 5,745,862 | A * | 4/1998 | Hirano | 701/1 |
| 6,157,892 | A * | 12/2000 | Hada et al. | 701/301 |

(Continued)

*Primary Examiner* — Mary Cheung
*Assistant Examiner* — Frederick Brushaber
(74) *Attorney, Agent, or Firm* — Rankin, Hill & Clark LLP

(57) ABSTRACT

Generally, the toe angle target speed limiting unit (84A) adds a toe angle target value $\alpha_{T2P}$ subjected to the primary delay to the result of a min-max processing the tracking error $\Delta\alpha_{T1A}$ by an adder (58A) to output it as a toe angle target value $\alpha_{T2A}$ to a target current calculating unit (86). However, in this toe angle target speed limiting unit (84A), a switching control (steering direction change control) for generating a maximum value $\Delta\alpha_{Tmax}$ as the toe angle target change quantity $\Delta\alpha_{T2}$ and a hold control are made when a neutral position of the toe angle target value $\alpha_{T2A}$ which is prior to the toe angle command value $\alpha_{T1}$ which is reached.

10 Claims, 16 Drawing Sheets

U.S. PATENT DOCUMENTS

| | | | |
|---|---|---|---|
| 6,505,700 B2 * | 1/2003 | Furumi et al. | 180/412 |
| 6,540,043 B2 * | 4/2003 | Will | 180/404 |
| 6,611,415 B1 * | 8/2003 | Hagidaira et al. | 361/160 |
| 8,290,658 B2 * | 10/2012 | Sugitani et al. | 701/29.1 |
| 2002/0195293 A1 * | 12/2002 | Will | 180/445 |
| 2007/0010945 A1 * | 1/2007 | Shoda et al. | 701/301 |
| 2009/0187302 A1 * | 7/2009 | Takenaka et al. | 701/29 |
| 2010/0191405 A1 * | 7/2010 | Sugitani et al. | 701/29 |
| 2012/0277956 A1 * | 11/2012 | Sasaki et al. | 701/41 |

\* cited by examiner

REAR WHEEL STEERING CONTROL DEVICE

TECHNICAL FIELD

The present invention relates to, for example, a rear wheel steering control device capable of controlling variation in a steering angle of rear wheels of a four-wheel vehicle.

BACKGROUND ART

Conventionally, to increase a turning characteristic, various four-wheel steering devices for controlling steering angles of rear wheels are proposed. For example, at a low traveling speed, making a turning angle of front wheels and steering angle of rear wheels antiphase can reduce a minimum turning radius. At a high traveling speed, to increase controllability in lane changing by making a turning angle of front wheels and a steering angle of rear wheels in phase. In addition, as a technology of independently controlling toe angles of left and right rear wheels, there are provided technologies in which an actuator uses a hydraulic mechanism, and an actuator uses a lead screw mechanism in place of the hydraulic mechanism (for example, FIGS. 1 to 6 of Patent Document 1).

Patent Document 2 discloses a technology in which a steering motor is installed to control variation in a direction of turning wheels (front wheels), and a controller controls a steering motor on the basis of information of a steering angle from a steering wheel to be operated by a driver. According to the steering device, even when a driver changes a steering angle direction in such a state that an actual turning angle of turning wheels has a response delay to a steering angle target of front wheels according to steering by a driver, it is prevented that a corresponding relationship between the actual steering angle of the front wheels and a steering direction of the vehicle in response to the actual turning angle of the front wheels becomes reverse by reflecting an actual turning angle measured at that timing in a turning angle target value.

PRIOR ART

Patent Documents

[PATENT DOCUMENT 1] JP 2008-201173 A
[PATENT DOCUMENT 2] JP 2006-69259 A (FIG. 4)

DISCLOSURE OF THE INVENTION

Summary of Invention

Problems to be Resolved by the Invention

However, the technology of Patent Document 2 is that relating to a steering device using an SBW method, and thus cannot be applied to the rear wheel steering control device as it is.

Conventionally, there may be a case where an actuator is required to generate a large drive force depending on suspension geometry in the rear wheel steering control devices. Because it is difficult in installation and arrangement to increase a motor size for increase in an output power of the actuator, there is a problem, inherent to the rear wheel steering control device, of securing a drive force by increasing a reduction ratio of a reduction mechanism, which is different from a front wheel steering device. In addition, because a response of the actuator, i.e., steering angle changing speed of rear wheels or toe angle changing speed of rear wheels, decreases due to increase in the reduction ratio, there is a problem of occurrence of response delay in actual turning angle or an actual toe angle when an absolute value of a changing speed of a turning angle value of the rear wheels or when an absolute value of changing speed of toe angle command value for the rear wheels.

Particularly, when the driver performs such a high speed change of a steering direction that a high speed direction change output is generated in a steering angle command value or a toe command value of the rear wheel, there may be a case where a direction of a steering angle command value of the rear wheels becomes opposite to a motion of an actual steering angle of the rear wheels or a direction of a toe angle command value of the rear wheels becomes opposite to a motion of an actual toe angle of the rear wheels. Accordingly there is a problem of occurrence of a strange feeling due to delay in vehicle behavior.

The present invention aims to provide a rear wheel steering device capable of solving the problems described above.

Measures for Resolving the Problems

To solve the problem, the invention of claim 1 is, in a rear wheel steering control device including an actuator for changing a steering angle of a rear wheel installed in a vehicle and control means for controlling driving the actuator, capable of changing a steering angle of the rear wheel, characterized in that: the control means comprises:

actuator control means for controlling the actuator;

steering angle command value calculating means for calculating a steering angle command value of the rear wheel on the basis of at least a turning state quantity of a front wheel;

target value setting updating means for performing a target value updating control by setting a steering angle target value of the rear wheel inputted into the actuator control means in response to the value of the steering command value of the rear wheel inputted from the steering angle command calculating means; and command value increase and decrease direction determining means for determining an increase and decrease direction of the calculated steering angle command of the rear wheel, wherein the target value setting updating means calculates a difference between the steering angle command value of the rear wheel and the steering target value of the rear wheel last set as well as limits the calculated target value change quantity to be equal to or lower than a predetermined maximum value at needs and is added to a steering angle target value of the rear wheel last set as a new steering angle target value of the new rear wheels; and when the command value increase and decrease direction determining means detects that the increase and decrease direction of the steering angle command value of the rear wheel changes, the command value increase and decrease direction determining means sets the target value change quantity in a direction opposite to the action of the actuator and to a predetermined maximum value to have a maximum speed, which is added to the steering angle target value of the rear wheel last set to conduct a target value updating control.

According to the invention of claim 1, the target value setting updating means calculates a difference between the steering angle command value of the rear wheel and the steering target value of the rear wheel last set as well as limits the calculated target value change quantity to be equal to or lower than a predetermined maximum value at needs and is added to a steering angle target value of the rear wheel last set as a new steering angle target value of the rear wheels to perform the target value updating control. In addition, the target value setting updating means performs the target updating control such that when the command value increase and decrease direction determining means detects that the increase and decrease direction of the steering angle command value of the rear wheel changes, the command value increase and decrease direction determining means sets the target value change quantity in a direction opposite to the action of the actuator and to a predetermined maximum value to have a maximum speed, which is added to the steering angle target value of the rear wheel last set to conduct a target value updating control. Accordingly, if there is a tracking delay in the steering angle target value of the rear wheel outputted to the actuator control means in accordance with the steering angle command value of the rear wheel, when the increase and decrease direction of the steering angle command value of the rear wheel changes, the tracking delay by then is neglected, the steering angle of the rear wheel is changed and controlled to have a maximum speed in an opposite direction by then. As a result, though the driver performs steering with such a quick steering direction change that a quick steering direction change output occurs in the steering angle command of the rear wheel, a steering angle control of the rear wheel capable of tracking a change in the steering angle command value of the rear wheel can be provided, which prevents the driver from having a strange feeling due to a delay in vehicle behavior.

The invention of claim 2 is, in the rear wheel steering control device as claimed in claim 1, characterized in that after the target value setting updating means starts the target value updating control by detecting change in the increase and decrease direction of the steering angle command value of the rear wheel, at timing when it is detected that the steering angle target value of the rear wheel reaches a neutral position, when the inputted steering angle command value of the rear wheel has not reached a neutral position, the target value setting updating means sets the steering angle target value of the rear wheel to hold the steering angle target value of the rear wheel at the neutral position for the target value updating control.

According to the invention of claim 2, when the command value increase and decrease direction determining means detects that the increasing and decrease direction of the steering angle command value of the rear wheel has change, after the target value setting updating means starts the target value updating control of the rear wheel to cause the actuator to have a maximum speed in a direction opposite to that by then, at timing when it is detected that the steering angle target value of the rear wheel reaches a neutral position earlier than the corresponding steering angle command value of the rear wheel, a hold control is performed to hold the steering angle target value of the rear wheel at the neutral position until the inputted steering angle command value reaches the neutral position of the steering angle command value of the rear wheel. As a result, while the steering angle command value of the rear wheel returns to the neutral position, due to overshooting of the steering target angle value of the rear wheel, i.e., overshooting of the actual steering angle of the rear wheel can be prevented, which may generate a strange feeling due to delay in convergence to straight advancing of the vehicle.

The invention of claim 3 is, in a rear wheel steering control device including an actuator for changing a steering angle of a rear wheel installed in a vehicle and control means for controlling driving the actuator, capable of changing a steering angle of the rear wheel, characterized in that: the control means comprises:

actuator control means for controlling the actuator;

command value calculating means for calculating a steering angle command value of the rear wheel on the basis of at least a turning state quantity of a front wheel;

target value speed limiting means for receiving an input of a turning command value of the rear wheel inputted from the command value calculating means and setting a first target value change quantity limited to or lower than a predetermined maximum value at needs so that the actuator can track;

command value increase and decrease direction determining means for determining an increase and decrease direction of the calculated turning command value of the rear wheel;

during-steering direction-changing target value change quantity setting means for setting a second target value change quantity to the predetermined maximum value have a new changed increase and decrease direction when the command value increases and decrease direction determining means detects a change in the increase and decrease direction;

output selecting means for outputting either of the first target value change quantity inputted from the target speed limiting means or the second target value change quantity inputted from the during-steering direction-changing target value change quantity setting means as a target value change quantity; and target value setting updating means for adding the target value change quantity inputted from the output selecting means to the last steering angle target value of the rear wheel and outputting a result to the actuator control means as a new steering angle target value of the rear wheel, wherein when a tracking error which a difference between the inputted steering angle command value of the rear wheel and the last set steering angle target value of the wheel exceeds a predetermined maximum value, the target value speed limiting means limits the first target value change quantity to the predetermined maximum value, and outputs the tracking error as it is as the first target value change quantity when the tracking error does not exceed the predetermined maximum value;

when the command value increase and decrease direction determining means detects a change in the decrease and increase direction of the steering angle command value of the rear wheel, the output selecting means selects and outputs the second target change quantity as the target value change quantity; and the target value setting updating means adds the target value change quantity inputted from the output selecting means to the last steering angle target value of the rear wheel, outputting a result to the actuator control means as a new steering angle target value of the rear wheel.

According to the invention of claim 3, when the command value increase and decrease direction determining means detects that the increase and decrease direction of the rear wheel has changed, the output selecting means switches the inputted first target value change quantity to the inputted second target value change quantity as the target value change quantity to selectively output. The target value setting updating means adds the inputted target value change quantity to the last steering angle target value of the rear wheel as a new steering angle target value of the rear wheel to be outputted to the actuator control means. Accordingly, on the basis of the first target value change quantity inputted to the output selecting means from the target speed limiting means, the target value setting updating means outputs the steering angle target value of the rear wheel by then to the actuator control means.

Though there is a tracking delay regarding the steering angle command value of the rear wheel, when the increase and decrease direction of the steering angle command value of the rear wheel has changed, the output selecting means switches to the second steering angle target value of the rear wheel inputted from the during-steering direction changing target value change quantity setting means to output it to the target updating means. As a result, though the driver performs a steering with a quick steering angle change output in the steering angle command value of the rear wheel, there is provided a steering control of the rear wheel which tracks the variation of the steering angle command value of the rear wheel. Accordingly, it is prevented the driver from having a strange feeling due to delay in the vehicle behavior.

The invention of claim 4 is, in the rear wheel steering control device as claimed in claim 3, characterized in that the control means further comprises:

during-steering direction-changing neutral detecting means for detecting that the steering angle target value reaches a neutral position after the output selecting means selects and outputs the second target change quantity as the target value change quantity when the command value increase and decrease direction determining means detects a change in the increase and decrease direction; and holding means for replacing the steering angle target value change quantity with zero, wherein the target value setting updating means causes the holding means to replace the steering angle target value change quantity with zero, adds it to the last steering angle target value of the rear wheel, and outputs the result as a new steering angle target value to the actuator control means when the during-steering direction-changing neutral detecting means detects that the steering angle target value reaches the neutral position after the output selecting means selects and outputs the second target change quantity as the target value change quantity.

According to the invention of claim 4, after the output selecting means selects and outputs a second target value as the target value change quantity when the during-steering direction-changing neutral detection means detects that the steering angle target value of the rear wheel reached a neutral position, if the inputted steering angle command value of the rear wheel has not reached the neutral position, the hold means is caused to replace the steering angle target value change quantity with zero. As a result, when the steering angle command value of the rear wheel returns to the neutral position, overshooting of the steering angle value of the rear wheel, i.e., it is prevented that the actual steering angle of the rear wheel overshoots, which generates a strange feeling due to delay in convergence to straight advancing of the vehicle.

The invention of claim 5 is a rear wheel steering control device including actuators for respectively, independently changing steering angles of left and right rear wheels installed in a vehicle and control means for controlling driving the respective actuators, capable of changing toe angles of the left and right rear wheels independently, characterized in that: the control means comprises:

actuator control means for independently controlling the respective actuators;

toe angle command value calculating means for calculating toe angle command values of the left and right rear wheels on the basis of at least a turning state quantity of a front wheel;

target value setting updating means for setting respective toe angle target values of the left and right rear wheels in accordance with respective toe angle command values of the left and right rear wheels inputted from the toe angle command value calculating means to perform a target value updating control, and command value increase and decrease direction determining means for determining increase and decrease directions of the respective calculated toe angle command values of the left and right rear wheels, wherein the target value setting updating means performs the target value updating control respectively and independently between the left and right for two sets including: the toe angle command value of the left wheel and the last set toe angle target values of the left rear wheel; and the toe angle command value of the right wheel and the last set toe angle target values of the right rear wheel by:

calculating differences between the toe angle command values of the rear wheels and the last set toe angle target values of the rear wheels as target value change quantities as well as limiting the calculated target value change quantities to or lower than a predetermined maximum values at needs, is added to the last set toe angle target values, and setting the results as new toe angle target value of the left and right rear wheels; and when the command value increase and decrease direction determining means detects that either of increase and decrease directions of the toe angle command values of the left and right rear wheels, for the rear wheel of which increase and decrease direction setting changes, setting the toe angle target value change quantity of the rear wheel of which increase and decrease direction setting changes to the predetermined maximum value to have a maximum speed, which is added to the last set toe angle target value of the rear wheels of which increase and decrease direction setting changes.

According to the invention of claim 5, the target value setting updating means performs the target value updating control respectively and independently between the left and right for two sets including: the toe angle command value of the left wheel and the last set toe angle target values of the left rear wheel; and the toe angle command value of the right wheel and the last set toe angle target values of the right rear wheel by:

calculating differences between the toe angle command values of the rear wheels and the last set toe angle target values of the rear wheels as target value change quantities as well as limiting the calculated target value change quantities to or lower than a predetermined maximum values at needs, is added to the last set toe angle target values, and setting the results as new toe angle target value of the left and right rear wheels; and when the command value increase and decrease direction determining means detects that either of increase and decrease directions of the toe angle command values of the left and right rear wheels, for the rear wheel of which increase and decrease direction setting changes, setting the toe angle target value change quantity of the rear wheel of which increase and decrease direction setting changes to the predetermined maximum value to have a maximum speed, which is added to the last set toe angle target value of the rear wheels of which increase and decrease direction setting changes. Accordingly, though there is a tracking error in the toe angle target value of said rear wheel outputted for the toe angle command value of the rear wheel to the actuator control means, when the increase and decrease direction of the steering angle command value of the rear wheel, the toe angle of the rear wheel is changed and controlled to the direction opposite to by then with the tracking delay by then being neglected. As a result, though the driver performs a steering with a quick steering angle change output in the steering angle command value of the rear wheel, there is provided a steering control of the rear wheel which tracks the variation of the steering angle command value of the rear wheel. Accordingly, it is prevented the driver from having a strange feeling due to delay in the vehicle behavior.

The invention of claim 6 is in the rear wheel steering control device as claimed in claim 5, characterized in that after start of the target value updating control in response to that the command value increase and decrease direction determining means detects that the increase and decrease direction of either of the toe angle command values of the left and right rear wheels changes, when it is detected that the inputted toe angle command value of said rear wheel has not reached a neutral position, at time when the toe angle target value of said rear wheel reaches the neutral position, the target value setting updating means sets the toe angle target value of said rear wheel to hold the toe angle target value of said rear wheel at the neutral position to perform the target value updating control.

According to the invention of claim 6, in the case where the command value increase and decrease direction determining means detects that the increase and decrease direction of either of the toe angle command values of the left and right rear wheels changes, when it is detected that the inputted toe angle command value of said rear wheel has not reached a neutral position, at time when the toe angle target value of said rear wheel reaches the neutral position, the target value setting updating means sets the toe angle target value of said rear wheel to hold the toe angle target value of said rear wheel at the neutral position to perform the target value updating control. As a result, when the steering angle command value of the rear wheel returns to the neutral position, overshooting of the steering angle value of the rear wheel, i.e., it is prevented that the actual steering angle of the rear wheel overshoots, which generates a strange feeling due to delay in convergence to straight advancing of the vehicle.

The invention of claim 7 is in a rear wheel steering control device including an actuator for changing a steering angle of a rear wheel installed in a vehicle and control means for controlling driving the actuator, capable of changing a steering angle of the rear wheel, characterized in that: the control means comprises:

actuator control means for controlling the actuator;

steering angle command value calculating means for calculating a steering angle command value of the rear wheel on the basis of at least a turning state quantity of a front wheel;

rear wheel actual steering angle acquiring means for acquiring information regarding the actual steering angle of the rear wheel;

target value setting updating means for setting the steering angle target value of the rear wheel inputted into the actuator control means in accordance with the steering angle command value of the rear wheel inputted from the steering commend value calculating means to perform a target value updating control; and command value increase and decrease direction determining means for determining an increase and decrease direction of the calculated steering angle command value of the rear wheel, wherein the target value setting updating means performs the updating target value updating control by:

calculating a difference between the steering angle command value of the rear wheel and the actual tuning angle acquired by the rear wheel actual steering angle acquiring means as a target value change quantity as well as limiting the calculated target value change quantity to or lower than a predetermined maximum value at needs, and adding the result to the actual steering angle value, which is set as a new steering angle target value of the rear wheel, wherein when detecting that an increase and decrease direction of the toe angle command value of the rear wheel, the command value increase and decrease direction determining means sets the target value change quantity to a predetermined maximum value to make an action of the actuator at a maximum speed in a direction opposite to that by then, which is added to the actual steering angle.

Accordingly to the invention of claim 7, the target value setting updating means calculating a difference between the steering angle command value of the rear wheel and the actual steering angle of the rear wheel as a target value change quantity as well as limits the calculated target value change quantity to or lower than a predetermined maximum value and is added to the actual steering angle of the rear wheel to set a new steering angle target value of the rear wheel to perform the target value updating control. When detecting that an increase and decrease direction of the toe angle command value of the rear wheel, the target value change quantity is set to a predetermined maximum value to make an action of the actuator at a maximum speed in a direction opposite to that by then, which is added to the actual steering angle. Accordingly, though there is a tracking delay in the actual steering angle of said rear wheel outputted for the toe angle command value of the rear wheel, when the increase and decrease direction of the steering angle command value of the rear wheel changes, the actual steering angle of the rear wheel is changed and controlled to the direction opposite to by then to have a maximum speed with the tracking delay by then being neglected. As a result, though the driver performs a steering with a quick steering angle change output in the steering angle command value of the rear wheel, there is provided a steering control of the rear wheel which can track the variation of the steering angle command value of the rear wheel. Accordingly, it is prevented the driver from having a strange feeling due to delay in the vehicle behavior.

The invention of claim 8 is, in the rear wheel steering control device as claimed in claim 7, characterized in that after start of the target value updating control in response to that the command value increase and decrease direction determining means detects that the increase and decrease direction of either of the toe angle command values of the left and right rear wheels changes, when it is detected that the inputted toe angle command value of the rear wheel has not reached a neutral position, at time when the toe angle target value of the rear wheel reaches the neutral position, the target value setting updating means sets the toe angle target value of the rear wheel to hold the toe angle target value of the rear wheel at the neutral position to perform the target value updating control.

According to the invention of claim 8, in a case where it is detected that the increase and decrease direction of the steering angle command value of the rear wheel changes, after start of the target value updating control, when it is detected that the inputted toe angle command value of the rear wheel has not reached a neutral position, at time when the toe angle target value of the rear wheel reaches the neutral position, a hold control is made to hold the toe angle target value of the rear wheel at the neutral position. As a result, when the steering angle command value of the rear wheel returns to the neutral position, overshooting of the steering angle value of the rear wheel, i.e., overshooting of the actual steering angle of the rear wheel, is prevented, which generates a strange feeling due to delay in convergence to straight advancing of the vehicle.

The invention of claim 9 is, in a rear wheel steering control device including actuators for respectively, independently changing steering angles of left and right rear wheels installed in a vehicle and control means for controlling driving the actuators, capable of changing toe angles of the left and right rear wheels independently, characterized in that: the control means comprises:

actuator control means for independently controlling the respective actuators;

toe angle command value calculating means for calculating toe angle command values of the left and right rear wheels on the basis of at least a turning state quantity of a front wheel;

actual toe angle information acquiring means for acquiring information regarding actual toe angle of the left and right rear wheels;

target value setting updating means for setting toe angle target values of the left and right rear wheels in accordance with toe angle command values of the left and right rear wheels inputted from the toe angle command value calculating means to perform a target value updating control, and command value increase and decrease direction determining means for determining increase and decrease directions of the respective inputted toe angle command values of the left and right rear wheels, wherein the target value setting updating means performs the target value updating control respectively and independently between the left and right, for two sets including: the toe angle command value of the left wheel and the actual toe angle of the left rear wheel by acquired by the actual toe angle information acquiring means; and the toe angle command value of the right wheel and the toe angle target values of the right rear wheel acquired by the actual toe angle information acquiring means by:

calculating a difference between the toe angle command values of the rear wheels and the actual toe angle target values of the rear wheels as a target value change quantity as well as limiting the calculated target value change quantity to or lower than a predetermined maximum values at needs which is added to the last set toe angle target values, and setting the results as a new toe angle target value of the left and right rear wheels; and when the command value increase and decrease direction determining means detects that either of increase and decrease directions of the toe angle command values of the left and right rear wheels, for said rear wheel of which increase and decrease direction setting changes, setting the toe angle target value change quantity of said rear wheel to the predetermined maximum value to have a maximum speed, and adding it to the actual toe angle of said rear wheels.

According to the invention of claim 9, the target value setting updating means performs the target value updating control respectively and independently between the left and right, by:

calculating a difference between the toe angle command values of the rear wheels and the actual toe angle of the rear wheels as a target value change quantity as well as limiting the calculated target value change quantity to or lower than a predetermined maximum values at needs which is added to the last set toe angle target values, and setting the results as a new toe angle target value of the left and right rear wheels.

In addition, when the command value increase and decrease direction determining means detects that either of increase and decrease directions of the toe angle command values of the left and right rear wheels, for said rear wheel of which increase and decrease direction setting changes, the toe angle target value change quantity of said rear wheel is set to the predetermined maximum value to have a maximum speed, and it is added to the actual toe angle of said rear wheels. Accordingly, though there is a tracking delay in the actual steering angle of said rear wheel outputted for the toe angle command value of the rear wheel, when the increase and decrease direction of the steering angle command value of the rear wheel changes, the actual steering angle of the rear wheel is changed and controlled to the direction opposite to by then to have a maximum speed with the tracking delay by then being neglected. As a result, though the driver performs a steering with a quick steering angle change output in the steering angle command value of the rear wheel, there is provided a steering control of the rear wheel which can track the variation of the steering angle command value of the rear wheel. Accordingly, it is prevented the driver from having a strange feeling due to delay in the vehicle behavior.

The invention of claim 10 is, in the rear wheel steering control device as claimed in claim 9, characterized in that after start of the target value updating control in response to that the command value increase and decrease direction determining means detects that the increase and decrease direction of either of the toe angle command values of the left and right rear wheels changes, when it is detected that the inputted toe angle command value of the rear wheel has not reached a neutral position, at time when the toe angle target value of the rear wheel reaches the neutral position, the target value setting updating means sets the toe angle target value of the rear wheel to hold the toe angle target value of the rear wheel at the neutral position to perform the target value updating control.

According to the invention of claim 10, after start of the target value updating control in response to that the command value increase and decrease direction determining means detects that the increase and decrease direction of either of the toe angle command values of the left and right rear wheels changes, when it is detected that the inputted toe angle command value of the rear wheel has not reached a neutral position, at time when the toe angle target value of the rear wheel reaches the neutral position, the target value setting updating means sets the toe angle target value of the rear wheel to hold the toe angle target value of the rear wheel at the neutral position to perform the target value updating control. As a result, when the steering angle command value of the rear wheel returns to the neutral position, overshooting of the steering angle value of the rear wheel, i.e., overshooting of the actual steering angle of the rear wheel, is prevented, which generates a strange feeling due to delay in convergence to straight advancing of the vehicle.

Advantageous Effect of Invention

The present invention can provide a rear wheel steering control device which does not generate a strange feeling due to delay in the vehicle behavior, when a driver makes such a high speed change in direction of steering as to generate an output of a steering angle command value of the rear wheels indicating a rapid change in steering angle.

BEST MODE FOR CARRYING OUT THE INVENTION

<<First Embodiment>>

With reference to FIGS. 1 to 4 will be described a rear wheel steering control device according to a first embodiment of the present invention.

Figure 1:
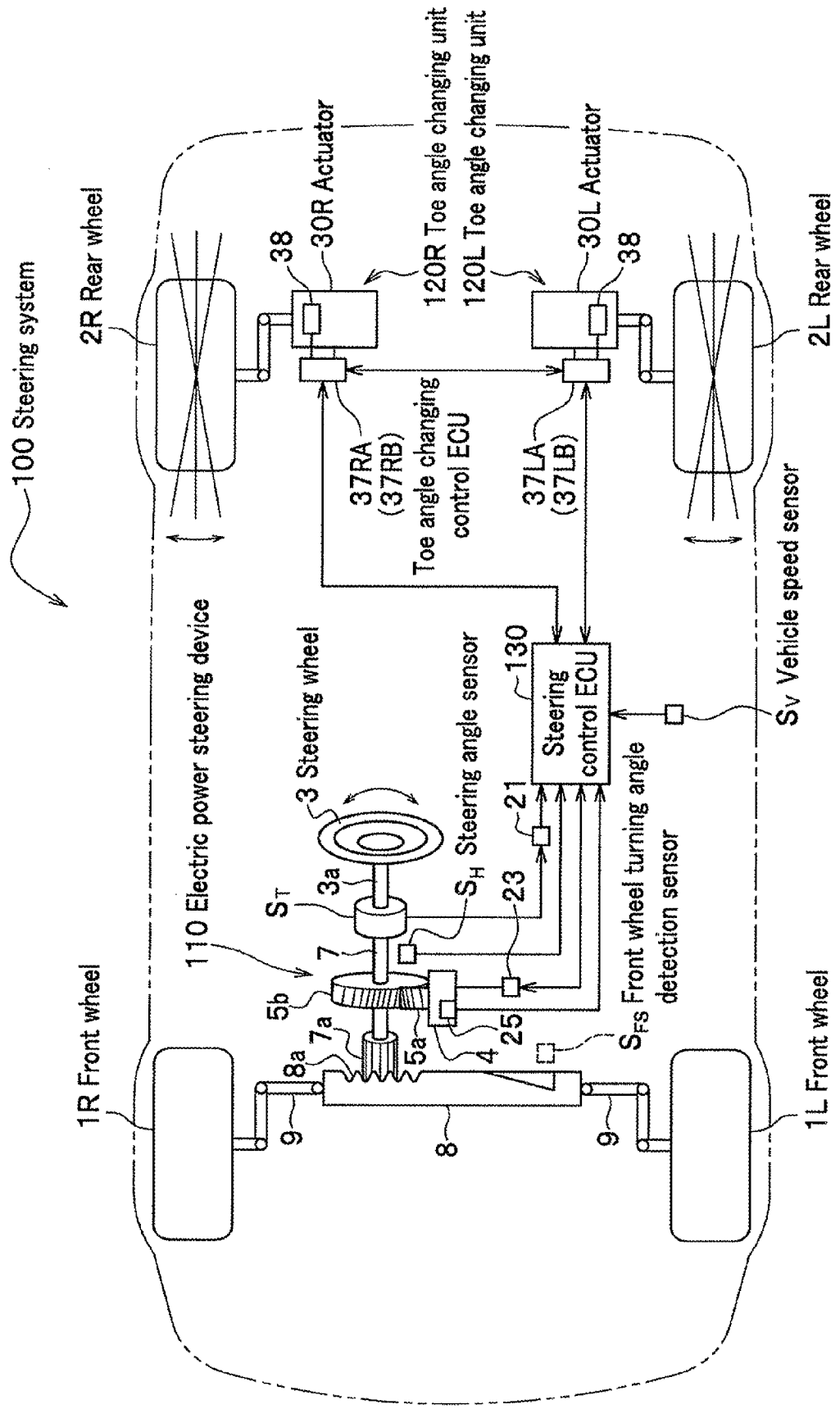
FIG. 1 is a conception view of a whole of a four-wheel vehicle having a steering system including a rear wheel steering control device according to embodiments of the present invention.

FIG. 1 is a conception view of a whole of a four-wheel vehicle having a steering system including a rear wheel steering control device according to a first embodiment of the present invention.

As shown in FIG. 1, a steering system 100 is configured to include an electric power steering device 110 for assisting steering with a steering wheel 3 to turn front wheels 1L, 1R with a motor 4, a toe angle changing units 120L, 120R for independently changing toe angles of the rear wheels 2L, 2R (steering angle of the rear wheels) in accordance with a steering angle of the steering wheel 3 and vehicle speed with actuators 30L, 30R, a steering control unit 130 for controlling the electric power steering device 110 and the toe angle changing units 120L, 120R (hereinafter referred to as a steering control ECU), a steering angle sensor $S_H$, a vehicle speed sensor $S_V$, etc. Here, a toe angle command value operating unit (steering angle value calculating means) 71 corresponds to "rear wheel steering control device" recited in Claims.

(Electric Power Steering Device)

In the electric power steering device 110, as shown in FIG. 1, a main steering shaft 3a provided with a steering wheel 3, an intermediate shaft (not shown), and a pinion shaft 7 are connected with two universal joints (not shown). A pinion gear 7a installed at a lower end of the pinion shaft 7 is geared with a rack gear 8a on a rack shaft 8 capable of reciprocative motion. The rack shaft 8 is connected, at both ends thereof, to left and right front wheels 1L, 1R through tie rods 9, 9.

According to the configuration, the electric power steering device 110 can change a traveling direction of the vehicle when the steering wheel 3 is operated. The rack shaft 8, the rack gear 8a, the tie rods 9, 9 form a steering mechanism.

The pinion shaft 7 is supported by a steering gear box (not shown) through three bearings at upper, middle, lower parts thereof.

In addition, the electric power steering device 110 includes a motor 4 for supplying an assist steering force for reducing a steering operation force on the steering wheel 3. A worm gear 5a installed on an output shaft of the motor 4 is geared with a worm wheel gear 5b.

In other words, the worm gear 5a and the worm wheel gear 5b form a reduction mechanism. In addition, the worm gear 5a connected to a rotor of the motor 4 and the motor 4, the worm wheel gear 5b, the pinion shaft 7, the rack shaft 8, the rack gear 8a, the tie rods 9, 9, etc. form a steering system.

The motor 4 is, for example, a three-phase brushless motor including a stator (not shown) having a plurality of field coils and the rotor (not shown) rotating within the stator for converting electric energy into a mechanical energy.

The electric power steering device 110 includes a motor driving circuit 23 for driving the motor 4, a resolver 25 for detecting a rotation angle of the motor 4, a torque sensor $S_T$ for detecting a pinion torque applied to the pinion shaft 7, a steering angle sensor $S_H$ for detecting a rotation angle of the pinion shaft 7, a differential amplifier 21 for amplifying an output of the torque sensor $S_T$, and a vehicld speed sensor $S_V$ for detecting a speed of the vehicle (vehicle speed).

A steering control ECU 130 of the steering system 100 includes an electric power steering controller 130a (see FIG. 2) described later for drive-controlling the motor 4 as a functional part of the electric power steering device 110.

The motor driving circuit 23 includes a plurality of switching devices such as a three-phase FET bridge circuit to drive the motor 4 by generating square-wave voltages with DUTY signals (DU, DV, DW) from the steering control unit 130.

In addition, the motor driving circuit 23 has a function for detecting three-phase motor currents with a Hall element.

The vehicle speed sensor $S_V$ detects the number of pulses per a unit time interval to detect the vehicle speed VS.

Functional configuration of the steering control unit 130 will be described later together with control of the electric power steering device 110 and control of toe angle changing units 120L, 120R.

<Toe Angle Changing Unit>

Next, will be simply described configuration of a toe angle changing unit.

The toe angle changing unit 120L, 120R are attached to left and right rear wheels 2L, 2R of the vehicle. The toe angle changing unit 120L includes an actuator 30L, a toe angle changing controller (hereinafter referred to as a toe angle changing control ECU) 37LA. Similarly, the toe angle changing unit 120R includes an actuator 30R, and a toe angle changing control ECU 37RA. The toe angle changing control ECUs 37LA, 37RA correspond to "actuator controlling means" recited in Claims.

Figure 3:
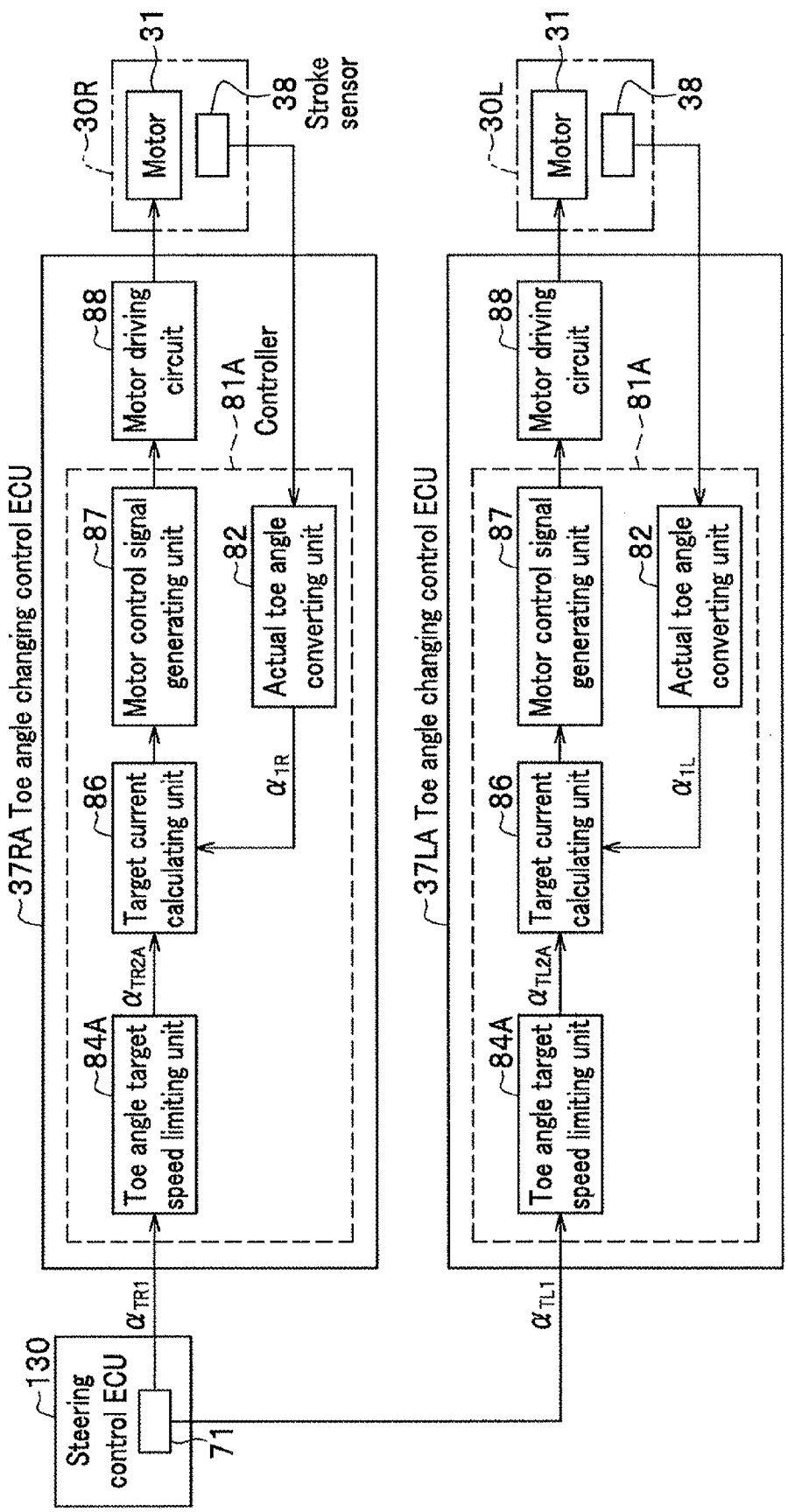
FIG. 3 is a functional block diagram of a toe angle change control ECU according to a first embodiment.
Figure 4:
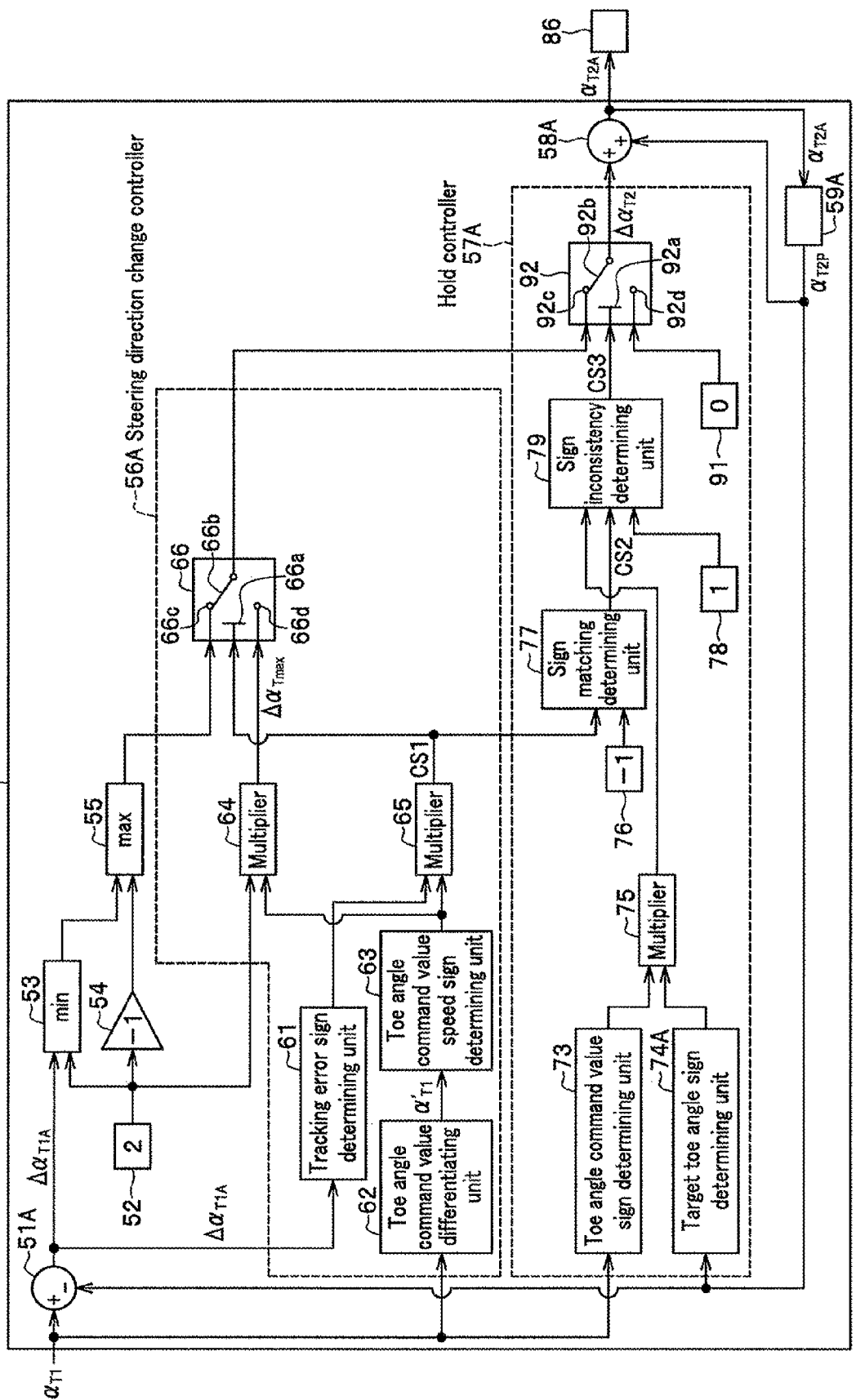
FIG. 4 is a detailed functional block diagram of a toe angle target speed limiting unit in the toe angle change control ECU according to the first embodiment.

The actuators 30L, 30R are attached to the rear wheels 2L, 2R and have configuration as described in FIGS. 3 and 4 of JP 2008-201173 A. The actuators 30L, 30R are respectively configured to include a motor 31, a reduction mechanism (not shown), a lead screw (not shown), etc.

The motor 31 is configured with a brush motor rotatable both clockwise and counterclockwise or a brushless motor. The reduction mechanism is configured with, for example, two-stage of planetary gears (not shown), etc. are combined.

The actuators 30L, 30R are each provided with a stroke sensor 38 for detecting an extension/shrinkage amount at a lead screw part (information regarding actual steering angle of the rear wheel, information regarding actual toe angle). The stroke sensor 38 includes, for example, a magnet therein to detect a position using magnetism. As described, steering angle regarding toe-in and toe-out of the rear wheels 2L, 2R (toe angle) can be individually detected at high accuracy by detecting position with the stroke sensors 38.

A toe angle when a wheel is turned to left from a neutral position is negative (−), and a toe angle when the wheel is turned to right from the neutral position is positive (+).

The toe angle changing control ECU 37LA is integrally attached to the actuator 30L, and the toe angle changing control ECU 37RA is integrally attached to the actuator 30R. The toe angle changing control ECU 37LA and the toe angle changing control ECU 37RA are respectively fixed to case bodies of the actuators 30L, 30R and connected to the stroke sensor 38 with connectors, etc. The toe angle changing control ECU 37LA and the toe angle changing control ECU 37RA are supplied with electric power from a power source (not shown) such as a battery installed on the vehicle. In addition, the steering control unit 130 and the motor driving circuit 23 are also supplied with electric power from a power source such as a battery with another system.

<Steering Control ECU>

Next, with reference to FIG. 2, will be described functions of the steering control ECU.

Figure 2:
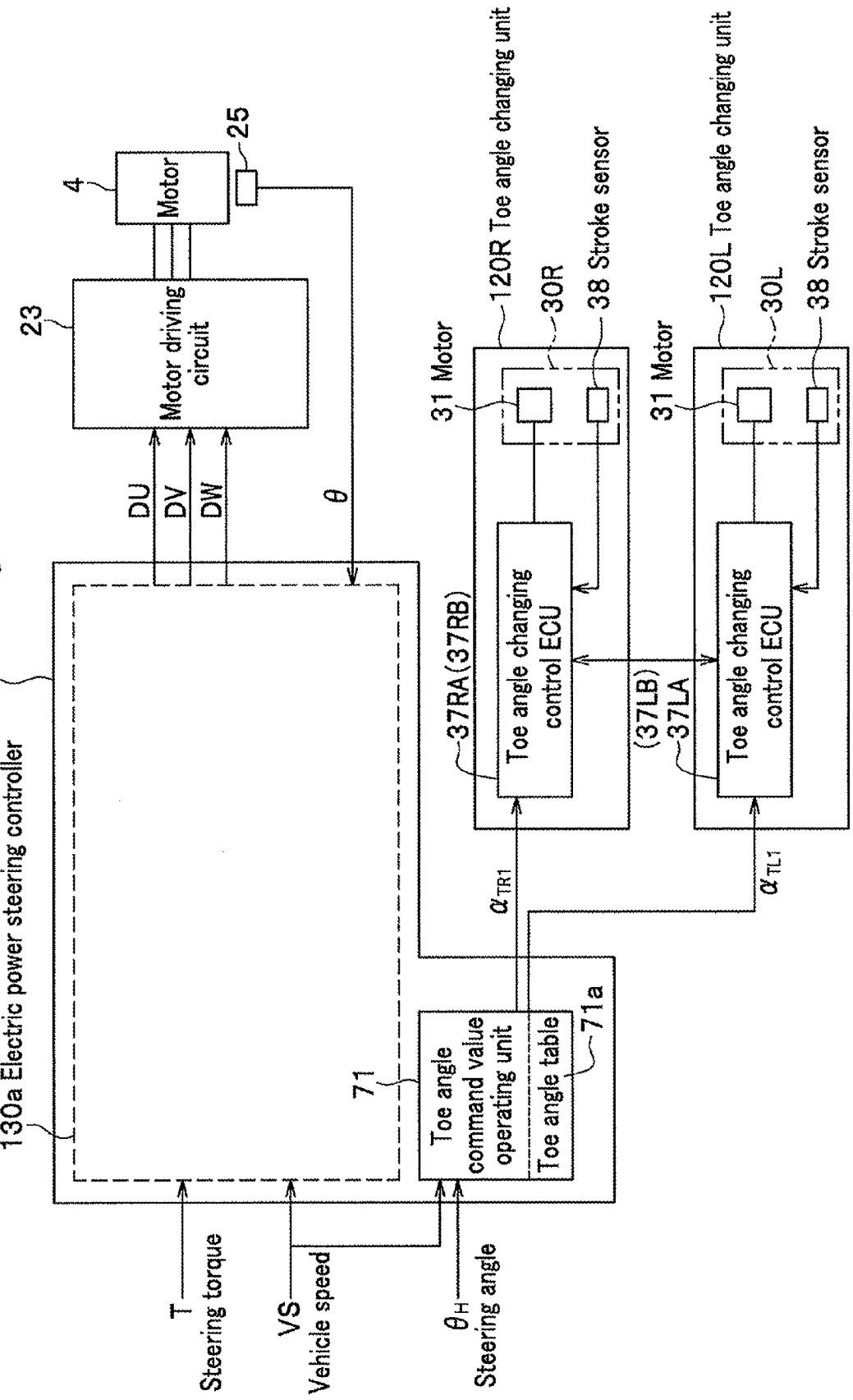
FIG. 2 is an outline control function diagram of a steering control ECU and a toe angle changing unit of the steering system.

FIG. 2 is a functional block diagram illustrating an outline control function of the steering control ECU and a toe angle changing unit in the steering system.

The steering control unit 130 is configured with a microcomputer including a CPU (central processing unit) a Rom (Read only Memory), and a RAM (Random Access Memory) (all not shown) and peripheral circuits, etc.

As shown in FIG. 2, the steering control unit 130 includes a electric power steering controller 130a for controlling the electric power steering unit 110, a toe angle command value calculating unit 71 (steering angle command value calculating means) for calculating a command value of toe angles (hereinafter referred to as "toe angle command value ") of the rear wheels 2L, 2R.

The toe angle command value corresponds to "steering angle command value of rear wheel" in Claims.

<Electric Power Steering Controller>

Though a detailed description will be omitted, the electric power steering controller 130a sets a target current signal for drive-controlling the motor 4 as described in FIG. 2 of the JP 2002-59855 A, performs inertia correction on the signal and damping correction on the signal. The corrected target current is subjected to a feedback control with an output current of the motor drive circuit to generate and supply the DUTY signals (DU, DV, DW) to the motor driving circuit 23.

<Toe Angle Command Value Calculating Unit>

Next, with referent to FIG. 2, will be described a rear wheel toe angle command value calculating unit.

A toe angle command value calculating unit 71 generates toe angle command values $\alpha_{TL1}$, $\alpha_{TR1}$ for the left and right rear wheels 2L, 2R from the vehicle speed signal VS and a steering angle of the steering wheel 3 (steering angle conditional amount) $\theta_H$ and inputs the toe angle command values $\alpha_{TL1}$, $\alpha_{TR1}$ into the toe angle changing control ECUs 37LA, 37RA for control the toe angle change of the left and right rear wheels 2L, 2R. The toe angle command values $\alpha_{TL1}$, $\alpha_{TR1}$ are generated by referring to a toe angle table 71a previously set for each of the left and right rear wheels 2L, 2R on the basis of the steering angle $\theta_H$, an angle velocity $\omega_H$ of the steering angle $\theta_H$, and the vehicle speed VS. The steering angle $\theta_H$ corresponds to "steering conditional amount of the front wheel" in Clims.

The angle velocity $\omega_H$ is obtained by differentiating the steering angle $\theta_H$ in the toe angle command value calculating unit 71.

For example, setting is made by the following equations (1) and (2).

$$\alpha_{TL1} = K_L(VS, \omega_H, \theta_H) \cdot \theta_H \quad (1)$$

$$\alpha_{TR1} = K_R(VS, \omega_H, \theta_H) \cdot \theta_H \quad (2)$$

where $K_L(VS), K_R(VS)$ are a steering angle ratio between the front and rear wheels depending on the vehicle speed VS, the steering angle $\theta_H$ and the angle velocity $\omega_H$. The toe angle command values $\alpha_{TL1}, \alpha_{TR1}$ of the rear wheels are generated antiphase in accordance with the steering angle $\theta_H$ of the steering wheel 3 so as to have a small radius turning within a predetermined range where the vehicle speed is low.

In a predetermined range where the speed is higher than the predetermined low speed range, when absolute values of the angle velocity $\omega_H$ is smaller than a predetermined value and the steering angle $\theta_H$ is within a predetermined range of left and right wheels, the toe angle command values $\alpha_{TL1}, \alpha_{TR1}$ of the respective rear wheels are set in phase in accordance with the steering angle $\theta_H$.

However, in a predetermined higher speed range where the speed is higher than the predetermined low speed range, when absolute values of the angle velocity $\omega_H$ is larger than the predetermined value or the steering angle $\theta_H$ is exceeds the predetermined range of left and right wheels, the toe angle command values $\alpha_{TL1}, \alpha_{TR1}$ of the respective rear wheels are set antiphase in accordance with the steering angle $\theta_H$.

<<Toe Angle Changing Control ECU>>

Next, with reference to FIG. 3, will be described in detail configuration of the toe angle changing control ECU. FIG. 3 is a functional block diagram of the toe angle changing control ECU in the first embodiment. Because the toe angle changing control ECUs 37LA, 37RA have the same configuration, the toe angle changing control ECU 37RA is exemplified for description.

As shown in FIG. 3, the toe angle changing control ECU 37RA has a function for driving control of the motor 31 and is configured with the controller 81A and a motor driving circuit 88. In addition, the toe angle changing control ECU 37RA is connected to the steering control unit 130 through a communication line.

The controller 81A is configured with a microcomputer including a CPU (central processing unit) a Rom (Read only Memory), and a RAM (Random Access Memory) (all not shown) and peripheral circuits, etc and includes an actual toe angle converting unit 82, a toe angle target speed limiting unit 84A, a target current calculating unit 86, and a motor control signal generating unit 87.

The actual toe angle converting unit 82 reads out a stroke position signal from the stroke sensor 38, converts a stroke position into an actual toe angle $\alpha_{1R}$, and inputs the result into the target current calculating unit 86.

The toe angle target speed limiting unit 84A, first, conducts, as a basic function, a limiting process for variation in the toe angle command value $\alpha_{TR1}$ after reading a toe angle command value (a steering angle command value of the rear wheel) $\alpha_{TR1}$ from the toe angle command value operating unit 71 at a constant period, for example, 100 msec and conducts, a steering direction change control process for accelerating a response to variation in steering direction change in the toe angle command value $\alpha_{TR1}$, and a hold control when the toe angle target value (steering angle target value of the rear wheel) $\alpha_{TR2A}$, which is faster than the toe angle command value $\alpha_{TR1}$ by the steering angle control process, reaches a neutral position. These controls are conducted at the constant period as described above. Details of the control process of the toe angle target speed limiting unit 84A will be described later with reference to FIGS. 5 to 7.

The target current calculating unit 86 calculates a target current signal for the feedback control on the basis of the toe angle target value $\alpha_{TR2A}$, and the actual toe angle $\alpha_{1R}$ of the rear wheel 2R from the actual toe angle converting unit 82 and supplies the calculated target current signal to the motor control signal generating unit 87.

Here, the target current signal is a current signal necessary for controlling the actual toe angle $\alpha_{1R}$ with actuators to track the toe angle target value $\alpha_{TR2A}$ at a desired speed.

As described above, the target current signal is set by feeding back the actual toe angle $\alpha_{1R}$ in response to the toe angle target value $\alpha_{TR2}$ inputted into the target current calculating unit 86 from the toe angle target speed limiting unit 84A. This provides the tracking control toward the toe angle command value $\alpha_{T1}$ by feeding back variation in the current value necessary for turning the rear wheel 2R due to the vehicle speed VS, a road circumference, a motion condition of the vehicle, and a wear condition of the tire.

The target current calculating unit 86 inputs the target current signal into the motor control signal generating unit 87 which generates and supplies a motor control signal to the motor driving circuit 88. The motor control signal is a signal including a value and a direction of the current supplied to the motor 31. The motor driving circuit 88 is formed with a bridge circuit of FETs (Field Effect Transistor) and supplies a motor current to the motor 31 on the basis of the motor control signal.

In the toe angle changing control ECU 37LA, the toe angle command value $\alpha_{TR1}$ is read as a toe angle command value $\alpha_{TL1}$; the toe angle target value $\alpha_{TR2}$ as a toe angle target value $\alpha_{TL2}$; the actual toe angle $\alpha_{1R}$ as an actual toe angle $\alpha_{1L}$; the rear wheel 2R as the rear wheel 2L; and the actuator 30R as an actuator 30L.

Here, the toe angle changing control ECUs 37LA, 37RA and the toe angle command value operating unit 71 form "control means in a rear wheel steering control device".

<<Toe Angle Target Speed Limiting Unit>>

Next, with reference to FIG. 4, occasionally, FIG. 3, will be described details of functions of the toe angle target speed limiting unit 84A. FIG. 4 is a detailed functional block diagram of the toe angle target speed limiting unit of the toe angle change control ECU in the first embodiment. In the description of FIG. 4, to representatively describe the toe angle target speed limiting unit 84A of the toe angle changing control ECU 37LA and the toe angle changing control ECU 37RA, the toe angle command value (steering angle commuted value of a rear wheel) $\alpha_{T1}$, the toe angle target value (turning target value of the rear wheel) $\alpha_{T2A}$, a toe angle target value after primary delay correction $\alpha_{T2P}$, a tracking error $\Delta\alpha_{T1A}$, a toe angle target value variation amount (steering angle target value variation amount) $\Delta\alpha_{T2}$ are referred. However, regarding the toe angle changing control ECU 37LA, specifically, they mean a toe angle command value (a steering angle command value of the rear wheel) $\alpha_{TL1}$, a toe angle target value (steering angle target value of the rear wheel) $\alpha_{T2LA}$, a toe angle target value after primary delay correction $\alpha_{T2PL}$, a tracking error $\Delta\alpha_{TL1A}$, and a toe angle target variation amount (steering angle target value variation amount) $\Delta\alpha_{TL2}$. Regarding the toe angle changing control ECU 37RA, specifically, they mean a toe angle command value (a steering angle command value of the rear wheel) $\alpha_{TR1}$, a toe angle target value (steering angle target value of the rear wheel) $\alpha_{T2RA}$, a toe angle target value after primary delay correction $\alpha_{T2PR}$, a tracking error $\Delta\alpha_{TR1A}$, and a toe angle target variation amount (steering angle target value variation amount) $\Delta\alpha_{TR2}$.

The toe angle target speed limiting unit 84A includes a subtractor 51A, a constant value outputting unit 52, a minimum value selecting unit 53, a fixed gain calculating unit 54, a maximum value selecting unit 55, a steering direction change controller 56A, a hold controller 57A, an adder 58A, and a primary delay correcting unit 59A.

The subtractor 51A subtracts the toe angle target value $\alpha_{T2A}$ last outputted in a repeated calculating process in the toe angle target speed limiting unit 84A from the toe angle command value $\alpha_{T1}$ inputted from the toe angle command value operating unit 71 to calculate and inputs the tracking error $\Delta\alpha_{T1A}$ into the minimum value selecting unit 53 and a tracking error sign discriminating unit 61 described later in the minimum value selecting unit 53 and the steering direction change controller 56A. The toe angle target value $\alpha_{T2A}$ last outputted is, specifically, inputted into the subtractor 51A as the toe angle target value $\alpha_{T2P}$ at the last time subjected to the primary delay correction in the primary delay correcting unit 59A.

The constant value outputting unit 52 generates and inputs a predetermined value for limiting a maximum value for tracking the toe angle target value variation amount $\Delta\alpha_{T2}$ on a positive side (right side) with respect to variation of the toe angle command value $\alpha_{T1}$, for example, "+2" into the minimum value selecting unit 53, the fixed gain calculating unit 54, and a multiplier 64, described later, of the steering direction change controller 56A.

The minimum value selecting unit 53 selects a smaller one from the tracking error and the maximum value "+2" on a positive side of the toe angle target variation amount and inputs the selected value into the maximum value selecting unit 55. The fixed gain calculating unit 54 performs a gain calculation of "-1" for the predetermined value inputted by the constant value outputting unit 52, for example, "+2", i.e., inputs "-2" into the maximum value selecting unit 55. This means that the fixed gain calculating unit 54 generates a predetermined value of "-2" for limiting a maximum value in tracking the toe angle target value variation amount $\Delta\alpha_{T2}$ on a negative side (left side). The predetermined value outputted by the constant value outputting unit 52 may also be made dependent on the vehicle speed at need. Setting the maximum value of the toe angle target value variation amount $\Delta\alpha_{T2}$ is set for each vehicle speed, for example, when the toe angle command value $\alpha_1$ diverges at a high speed, setting the toe angle target value $\alpha_{T2A}$ can be limit within a stable region for driving the vehicle.

The maximum value selecting unit 55 selects the larger value from the small value inputted from the minimum value selecting unit 53 and the maximum value of "-2" on the negative side and inputs the selected value into a two value selecting unit 66 described later of the steering direction change controller 56A as one value selected by the two value selecting unit 66 (an input value to a terminal 66c). Here, the input value to the terminal 66c corresponds to "first target value variation amount" described in Claims.

Generally, the toe angle target speed limiting unit 84A adds the last toe angle target value $\alpha_{T2P}$ subjected to the primary delay correction to the result of the maximum minimum limiting process (also referred to as a min-max process) by the adder 58A, and the toe angle target speed limiting unit 84A supplies the added value to the target current calculating unit 86 as a current toe angle target value $\alpha_{T2A}$. However, in this embodiment, the toe angle target speed limiting unit 84A further performs a change control (steering direction change control) for generating and outputting a maximum value $\Delta\alpha_{Tmax}$ as the toe angle target changing quantity $\Delta\alpha_{T2}$ in a steering direction change control unit 56A described later, and a hold control for waiting for that the toe angle command value $\alpha_{T1}$ catches up the toe angle target value $\alpha_{T2P}$ with respect to reaching the neutral position of the last toe angle target value $\alpha_{T2P}$ proceeding to the toe angle command value $\alpha_{T1}$ in the hold control unit 57A described later after the steering angle direction change control. Details of the functions of the steering direction change controller 56A and the hold control unit 57A will be described later.

The subtractor 51A, the constant value outputting unit 52, the minimum value selecting unit 53, the gain calculating unit 54, the maximum value selecting unit 55 corresponds to "target value speed limiting means" in Claims. The tracking error sign determining unit 61, the multipliers 64, 56 correspond to "a during-steering direction-changing target value change quantity setting means. The two value selecting unit 66 corresponds to "output selecting means" described in Claims. The adder 58A corresponds to "target value setting updating means" in Claims.

In addition the subtractor 51A, the constant value outputting unit 52, the minimum value selecting unit 53, the fixed gain calculating unit 54, the maximum value selecting unit 55, the tracking error sign determining unit 61, the multiplier 64, the multiplier 65, the two value selecting unit 66, the hold controller 57A, and the adder 58A correspond to" target value setting updating means.

The adder 58A adds the toe angle target value $\alpha_{T2P}$ subjected to the primary delay correction at the last time from the primary delay correcting unit 59A to the output of the hold controller 57A and a toe angle target value $\alpha_{T2A}$ into the target current calculating unit 86. Here, the correction constant in the primary delay correcting unit 59A is set in accordance with time delay associated with the period of the repeated operation in the toe angle target speed limiting unit 84A.

<Steering Direction Change Controller>

Next, with reference to FIG. 4, occasionally, FIG. 6, will be described details of the steering direction change control unit 56A.

The steering direction change controller 56A is configured with a tracking error sign determining unit 61, a toe angle command value differentiating unit (command value increase and decrease direction determining means) 62, a toe angle command value speed sign determining means (command value increase and decrease determining means) 63, multipliers 64, 65, and a two value selecting unit 66.

The tracking error sign determining unit 61 determines a sign of the tracking error $\Delta\alpha_{T1A}$ inputted by the subtractor 51A among a positive (+), zero, and a negative (−) and inputs one of values "+1", "0", or "−1" into the multiplier 65.

The toe angle command value differentiating unit 62 calculate and inputs a toe angle command value speed $\alpha'_{T1}$ by time differentiating the toe angle command value $\alpha_{T1}$ into the toe angle command value speed sign determining unit 63.

The toe angle command value speed sign determining unit 63 determines and a sign of the toe angle command value speed $\alpha'_{T1}$ among a positive (+), zero, and a negative (−) and inputs one of values "+1", "0", or "−1" into the multiplier 64 and the multiplier 65 corresponding to the determination result.

The multiplier 64 multiplies the signal of "+2" from the constant value outputting unit 52 by one of the values +1, 0, or −1 corresponding to the determination result from the toe angle command value speed sign determining unit 63 and inputs the result as another value to be selected by the two value selecting unit 66 (an input value to the terminal 66d).

Here, the input value to the terminal 66d corresponds to "second target value variation amount" in CLAIMS.

The multiplier 65 multiplies either value of +1, 0, −1 corresponding to the determination result from the tracking error sign determining unit 61 by either value of +1, 0, −1 corresponding to the determination result from the toe angle command value speed sign determining unit 63 and inputs a control value CS1 of the result to the two value selecting unit 66 as a control input (input value to the terminal 66a) and the control value CS1 into a sign matching determining unit 77 in the hold controller 57A described later.

In FIG. 4, the two value selecting unit 66 represents a control logic circuit for selectively connect a movable contact 66b to one of two values inputted to the terminals 66c and 66d in an analog circuit notation. More specifically, when the control value CS1 is −1, the movable contact 66b connects to the terminal 66d, i.e., selects the input value from the multiplier 64. When the control value CS1 is 0 or +2 other than −1, the movable contact 66b is connected to the terminal 66c, i.e., selects the input value from the maximum value selecting unit 55.

The value selected by the two value selecting unit 66 is inputted to the hold controller 57A as one value (an input value to the terminal 92c) to be selected by the two value selecting unit 92 of the hold controller 57A described later.

Figure 6:
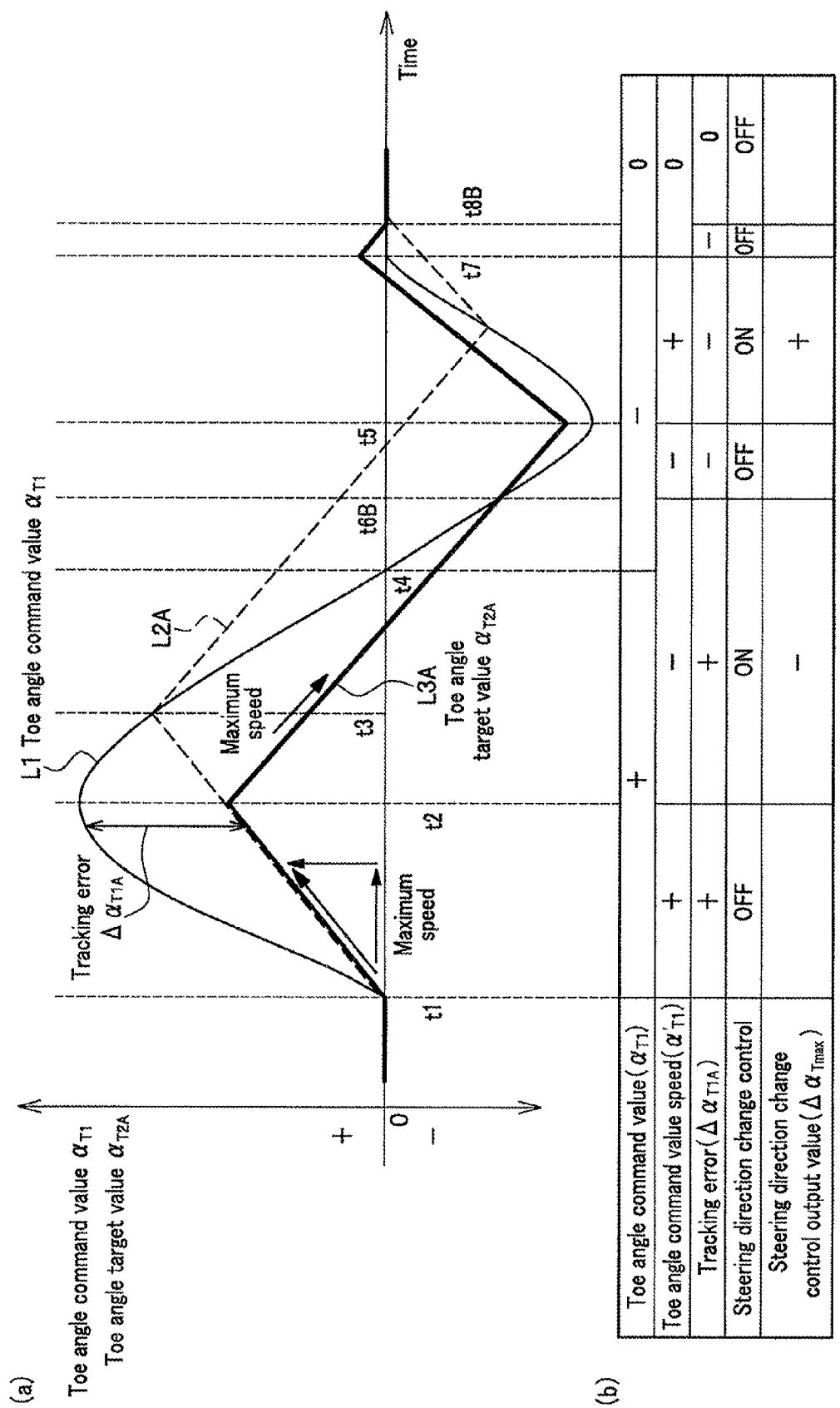
FIG. 6 is a diagram for describing an operation of the toe angle direction change control.

Here, when the control value CS1 inputted by the multiplier 65 into the two value selecting unit 66 is −1, it is in a case where a sign of the tracking error $\Delta\alpha_{T1A}$ outputted by the tracking error sign determining unit 61 and the sign of the toe angle command value speed $\alpha'_{T1}$ outputted by the toe angle command value speed sign determining unit 63 are opposite to each other regarding plus and minus (see FIG. 6($b$)). At that time, the steering direction change control becomes in an ON state, so that the movable contact 66b in the two value selecting unit 66 is connected to the terminal 66d. When the control value CS1 inputted into the two value selecting unit 66 from the multiplier 65 is other than −1, the steering direction change control becomes in an OFF state, the movable contact 66b is connected to the terminal 66c in the two value selecting unit 66.

When the control value CS1 inputted into the two value selecting unit 66 from the multiplier 65 is −1, the input value to the terminal 66d in the two value selecting unit 66 from the multiplier 64 ("steering direction changing control output value" indicated in FIG. 6($b$) is either value of +2 which is a maximum value $\Delta\alpha_{Tmax}$ as the toe angle target variation amount $\Delta\alpha_{T2}$ having the same sign as the toe angle command value speed $\alpha'_{T1}$ or −2.

Accordingly, when the control value CS1 inputted into the two value selecting unit 66 from the multiplier 65 is −1, the input value to the terminal 92c of a two value selecting unit 92 described later is either of +2 or −2.

<Hold Controller>

Figure 7:
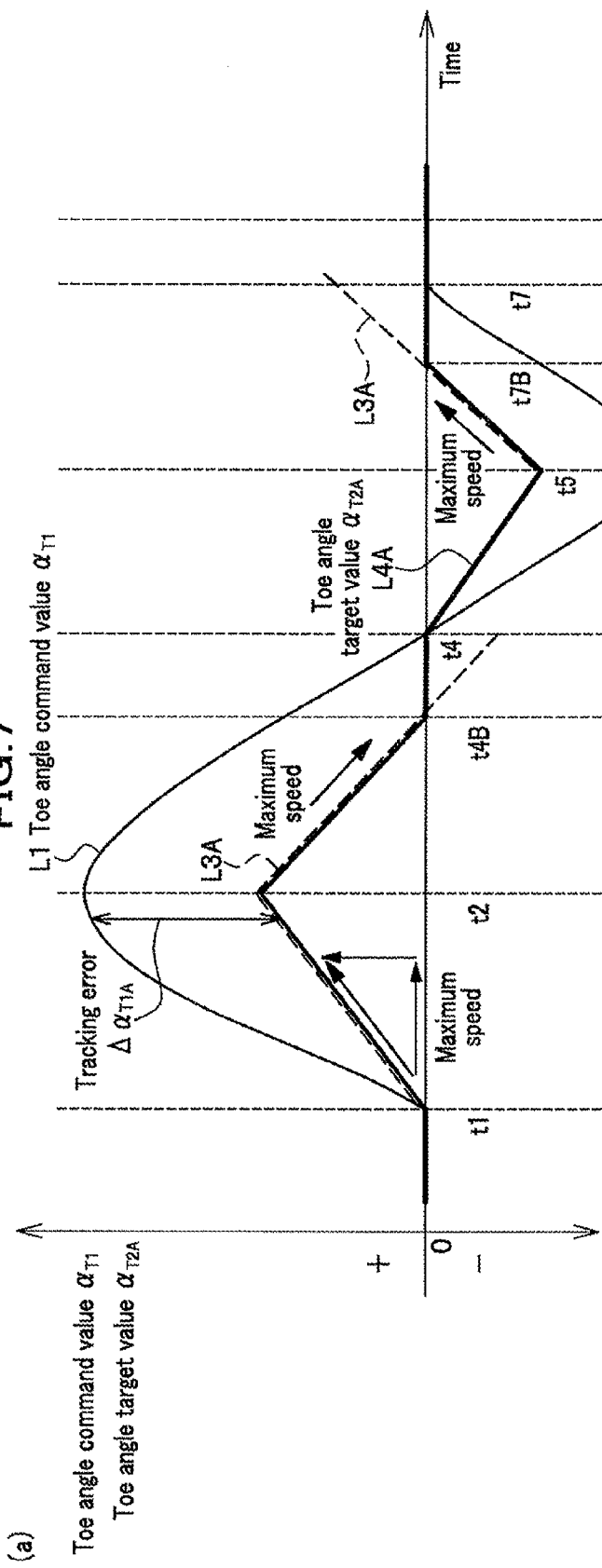
FIG. 7 is a diagram for describing an operation of the hold control after the toe angle direction change control.

Next, with reference to FIG. 4, occasionally FIG. 7, will be described details of functions of the hold controller 57A.

The hold controller 57A is configured to include a toe angle command value sign determining unit 73, a target toe angle sign determining unit 74A, a multiplier 75, a fixed value outputting units 76, 78, 91, a sign matching determining unit 77, a sign inconsistency determining unit 79, and a two value selecting unit 92.

The toe angle command value sign determining unit 73 determines a sign of the toe angle command value $\alpha_{T1}$ from the toe angle command value operating unit 71 (more specifically, toe angle command values $\alpha_{TL1}$, $\alpha_{TR1}$ among plus, zero, minus and inputs either value of +1, 0, −1 correspondingly into the multiplier 75.

The target toe angle sign determining unit 74A determines a sign of the last toe angle target value $\alpha_{T2P}$ subjected to the primary delay correction from the primary delay correcting unit 59A and inputs either value of +1, 0, or −1 into the multiplier 75 correspondingly.

The multiplier 75 multiplies the input value from the toe angle command value sign determining unit 73 by the input value from the target toe angle sign determining unit 74A and inputs the result into the sign inconsistency determining unit 79.

The fixed value outputting unit 76 generates a signal of "−1" which is a predetermined value for comparison reference for detecting a state in which the control value CS1 indicating that the steering direction change control is ON outputs a value of −1 in the steering direction change controller 56A.

The sign matching determining unit 77 determines whether the value of the control value CS1 inputted from the multiplier 65 is consistent with the value of −1 inputted from the fixed value outputting unit 91. Only when there is consistency, the sign matching determining unit 77 generates a control value CS2 indicating consistency, for example, a value of +1. When there is inconsistency, the sign matching determining unit 77 generates a control value CS2 indicating consistency, for example, a value of −1. The sign matching determining unit 77 then inputs the value CS2 into the sign inconsistency determining unit 79.

The fixed value outputting unit 78 generates a predetermined reference value of "+1" for determining a sign inconsistency in the sign inconsistency determining unit 79 and inputs the signal into the sign inconsistency determining unit 79.

Only when the control value CS2 is +1, the sign inconsistency determining unit 79 determines whether the input value of +1 from the fixed value outputting unit 78 with either value (+1, 0, −1) inputted from the multiplier 75. When there is inconsistency, the sign inconsistency determining unit 79 generates +1 indicating that the hold control is ON as a control value CS3. When there is not inconsistency, the sign inconsistency determining unit 79 generates −1 indicating that the hold control is OFF as the control value CS3 and inputs the generated value into the two value selecting unit 92 as a control input (an input value to a terminal 92a).

The fixed value outputting unit 91 generates a signal having a value of 0 (zero) for setting the toe angle target variation amount $\Delta\alpha_{T2}$ for hold controlling in the hold controller 57A and inputs the generated value as another input value (an input value to the terminal 92d) to be selected by the two value selecting unit 92.

In FIG. 4, the two value selecting unit 92 represents a control logic circuit for selectively connecting a movable contact 92b to one of two values inputted to the terminals 92c and 92d in an analog circuit notation in accordance with the control value CS3 inputted into the terminal 92a. More specifically, only when the control value CS3 is +1, the movable contact 92b is connected to the terminal 92d, i.e., the input value of 0 (zero) from the fixed value outputting unit is selected. When the control value CS3 is −1, the movable contact 92b is connected to the terminal 92c, i.e., selects the output value from the two value selecting unit 66 of the steering direction change controller 56A.

The value selected by the two value selecting unit 92 is inputted into the adder 58A.

Here, a case where the control value CS3 inputted into the two value selecting unit 92 from the sign inconsistency determining unit 79 is +1, corresponds to a case where, when the steering direction change control in the steering direction change controller 56A is ON, the sign of the toe angle command value $\alpha_{T1}$ is inconsistent with the previous toe angle target value $\alpha_{T2P}$ which is subjected to a primary delay correction, i.e., they are opposite (plus and minus) or either of them is zero (see FIG. 7B), the hold control at that time becomes an ON state, so that the movable contact 92b in the two value selecting unit 92 is connected to the terminal 92d and supplies a value of 0 (zero) to the adder 58A.

Here, the toe angle command value sign determining unit 73, the target toe angle sign determining unit 74A, the multiplier 75, the fixed value outputting units 76, 78, the sign matching determining unit 77, and the sign inconsistency determining unit 79 correspond to "during-steering direction-changing neutral detecting means" in Claims. The fixed value outputting unit 91 and the two value selecting unit 92 correspond to "hold means" in Claims.

This case occurs when there is time variation of the toe angle command value $\alpha_{T1}$ shown on a curve L1 in FIG. 7(a), and the sign of the tracking error $\Delta\alpha_{T1A}$ from the last toe angle target value $\alpha_{T2P}$ does not change and thus remains as the sign is plus or minus, and at, for example, time t2, when the sign of the toe angle command value speed $\alpha'_{T1}$ changes from plus to minus, the steering direction change control in the present embodiment becomes an ON state, an output of the two value selecting unit 66 becomes "−2" which is a maximum value $\Delta\alpha_{Tmax}$ of "−2" in the output of the two value selecting unit 66. At the two value selecting unit 92, the movable contact 92b keeps connection to the terminal 92d to also outputs a value of "−2" as the toe angle target variation amount $\Delta\alpha_{T2}$. Then, this sate continues up to time t4B. As a result, there may be a case where at time t4B the toe angle target value $\alpha_{T2A}$ becomes at a neutral position (value is zero) earlier than the target command value $\alpha_{T1}$. Then, when the toe angle target value $\alpha_{T2A}$ comes at the neutral position earlier than the target command value $\alpha_{T1}$, supplies the toe angle target variation $\Delta\alpha_{T2}$ as zero to the adder 58A. Then, the toe angle target value $\alpha_{T2A}$ is subjected to the hold control to control the position at the neutral position during this state. In other words, the actual toe angle $\alpha_1$ is also subjected to the hold control to control the position at a neutral position to track the toe target value $\alpha_{T2A}$ during this state, which prevents the actual toe angle $\alpha_1$ in an opposite direction which is inconsistent with the toe angle command value $\alpha_{T1}$.

Figure 5:
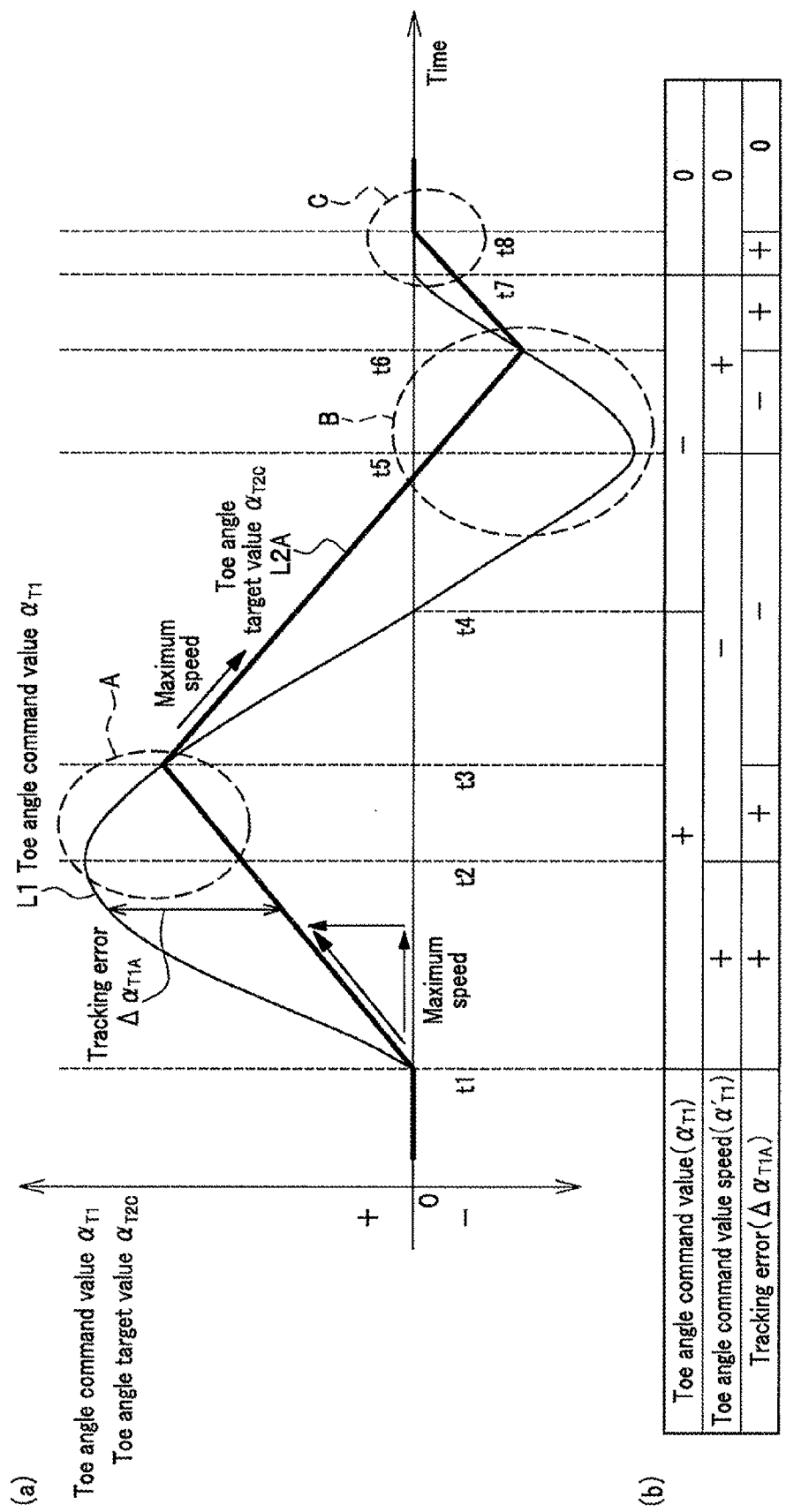
FIG. 5 is a diagram illustrating for describing an operation of a toe angle direction changing control in a prior art.

FIG. 5 is a diagram illustrating for describing an operation of a toe angle direction changing control in a prior art. (a) is an illustration showing a time variation of the toe angle command value and the toe angle target value. (b) is a time chart showing a toe angle command value, a toe angle command value speed, and a tracking error correspondingly to the time variation in (a). In the prior art, when the tracking error $\Delta\alpha_{T1A}$ becomes large as the toe angle command value $\alpha_{T1}$ varies at or higher than a predetermined speed from time t1, the toe angle target variation amount (toe angle target speed) is set to the upper limit value (corresponding to the maximum variation amount of "2") to cause the toe angle target value $\alpha_{T2C}$ to track the toe angle command value $\alpha_{T1}$. Next, after the toe angle target value $\alpha_{T2C}$ has caught up the toe angle command value $\alpha_{T1}$ at time t3, the toe angle target value $\alpha_{T2C}$ is caused to try to track it in accordance with the tracking error $\Delta\alpha_{T1A}$ of which sign becomes opposite. In such a control, though the toe angle command value $\alpha_{T1}$ varies in opposite direction before time t2, the toe angle target value $\alpha_{T2C}$ is controlled in a direction which is kept that before the time t2, which provides a strange feeling to the driver.

This is the same as control at a part B during time from t4 to t7 in FIG. 5. In addition, in the prior art control, as shown at a part C during time t7 to t8, though the toe angle command value $\alpha_{T1}$ returns zero (neutral position), the toe angle value $\alpha_{T2C}$ does not rapidly return and show a response delay, so that a turning motion of the vehicle continues, which provides a different feeling to the driver as a problem.

When, the technology of turning angle control for the front wheel in the SBW type steering device disclosed in Patent Document 2 was applied to the toe angle control of the rear wheel, there were a such a control that at time t2, a toe angle target value is replaced with an actual angle $\alpha_1$ at the time t2 and at the same time a tracking error $\Delta\alpha_{T1A}$ should be corrected. However, if it was assumed that a control for correcting the tracking error $\Delta\alpha_{T1A}$ was made by replacing the toe angle target value $\alpha_{T2C}$, because the control was made in accordance with the magnitude of the tracking error $\Delta\alpha_{T1A}$ and its sign, the control could not sufficiently track the steering direction change in the toe angle command value $\alpha_{T1}$ because the response of the actual toe angle $\alpha_1$ is slow when the reduction ratio of the reduction mechanism in the actuators 30L, 30R used in the toe angle change devices 120L, 120R is large.

Next, with reference to FIG. 6, will be described tracking control method for the actual toe angle $\alpha_1$ during steering direction change of the toe angle command value $\alpha_{T1}$ in the present embodiment. FIG. 6 is a diagram for describing an operation of the toe angle direction change control. (a) is a diagram for describing a time variation of the toe angle command value and the toe angle target value. (b) is a time chart, corresponding to time variation in (a), illustrating sign variation of the toe angle command value, a toe angle command value speed, tracking error, ON and OFF states of the steering direction change control, and control output value variation when the steering direction change control is in the angle command value of the rear wheel on the basis of at least a turning state.

According to the present embodiment, as shown by a curve L3A in (a) of FIG. 6, when the toe angle command value $\alpha_{T1}$ varies from time t1 at a speed higher than a predetermined speed and the tracking error $\Delta\alpha_{T1A}$ becomes large, in the maximum value selecting unit 55 the toe angle target changing quantity (toe angle target speed) is limited to an upper limit value (corresponding to a maximum variation value of "2") which the actuator 30 can track to cause the toe angle target value $\alpha_{T2A}$ to track the toe angle command value $\alpha_{T1}$.

When the toe angle command value $\alpha_{T1}$ varies at time t2 in an opposite direction to the direction before the time t2 (the turning direction is changed), the control value CS1 outputted by the multiplier 65 becomes –1 (corresponding to the steering direction changing control output value in FIG. 6(b)), the two value selecting unit 66 inputs a value of the maximum changing quantity $\Delta\alpha_{Tmax}$ having a value of –2 calculated by the multiplier 64 into one terminal of the two value selecting unit 92 (inputs into a terminal 92c). The two value selecting unit 92 inputs the value inputted into the terminal 92c into an adder 58A as a toe angle target changing quantity $\Delta\alpha_{T2}$, the value is added to the toe angle target value $\alpha_{T2P}$ subjected to the primary delay correction, and the result is inputted into the target current calculating unit 86. As described above, when the toe angle command value $\alpha_{T1}$ encounters the steering direction change at the time t2, the maximum changing quantity $\Delta\alpha_{Tmax}$ is set to have the same sign as the toe angle command value variation speed $\alpha'_{T1}$. That is, a control is carried out to change the toe angle target value $\alpha_{T2A}$ at a maximum speed at the time t2 toward the neutral direction. As a result, the steering direction change control for the actual toe angle $\alpha_1$ can be performed at an earlier timing than the prior art in which the tracking error $\Delta\alpha_{T1A}$ subjected to the min-max process in accordance with the tracking error $\Delta\alpha_{T1}$ is simply used as the toe angle target changing quantity $\Delta\alpha_{T2}$. Accordingly, the toe angle of the rear wheel can be controlled without a strange feeling occurrence in a driver in such a turning motion of the vehicle that the steering direction change is made in the toe angle of the rear wheel.

If the control is left as it is, the toe angle target value $\alpha_{T2A}$ may vary to the left direction earlier than the direction indicated by the toe angle command value $\alpha_{T1}$. To correct this is a function of the hold controller 57A (see FIG. 4).

Regarding this, when there is not the function of the hold controller 57A, as shown by the curve L3A in FIG. 6, the sign of the tracking error $\Delta\alpha_{T1A}$ becomes minus after expiration of t6B, which agrees with the minus sign of the toe angle command value speed $\alpha'_{T1}$, so the steering direction change control is made OFF for the first time. From the time t6B to time t5, the tracking control is performed for the toe angle target value $\alpha_{T2A}$ toward the toe angle command value $\alpha_{T1}$ with the toe angle target changing quantity $\Delta\alpha_{T2}$ which is obtained by the min-max process for the value of the general tracking error $\Delta\alpha_{T1A}$. After that, when the toe angle command value $\alpha_{T1}$ encounters the steering direction change at the time t5, the control value CS1 outputted by the multiplier 65 has a value of –1 similar to that after the time t2, so that the value of the maximum changing quantity $\Delta\alpha_{Tmax}$, i.e., a value of +2 calculated by the multiplier 64 (corresponding to the steering direction change control output value in FIG. 6(b), is inputted into one input (terminal 92c) of the two value selecting unit 92. In the two value selecting unit 92, the value inputted into the terminal 92c is inputted as the toe angle target changing quantity $\Delta\alpha_{T2}$ into the adder 58A and added to the toe angle target value $\alpha_{T2P}$ subjected to the primary delay correction, and the result is inputted into the target current calculating unit 86 as the toe angle target value $\alpha_{T2A}$. As describe above, when the toe angle command value $\alpha_{T1}$ encounters the steering direction change at the time t5, immediately, it is set to the maximum changing quantity $\Delta\alpha_{Tmax}$ having the same sign as the toe angle command value variation speed $\alpha'_{T1}$. More specifically, a control is performed to change the toe angle target value $\alpha_{T2A}$ at a maximum speed toward the neutral direction at the time t5.

In addition, after time t7, when the toe angle command value $\alpha_{T1}$ returns to zero, the control value CS1 outputted at that time by the multiplier 65 becomes 0, and the steering direction change control in the steering direction change controller 56A becomes OFF, so that the toe angle target value $\alpha_{T2A}$ is converged into zero with the toe angle target changing quantity $\Delta\alpha_{T2}$ subjected to the general min-max process. Accordingly, the problem may be left only by the function of the steering direction change controller 56A in that the toe angle target value $\alpha_{T2A}$ shoots over the toe angle command value $\alpha_{T1}$ after the steering direction change control becomes in an ON state. In addition, for reference the curve L2A shown in FIG. 5(a) is also shown in FIG. 6(a).

Next with reference to FIG. 7, will be described a hold control method after the steering direction change control of the toe angle command value $\alpha_{T1}$ according to the embodiment. FIG. 7 is a drawing illustrating an operation of the hold control after the steering direction change control of the toe angle. (a) is a drawing for illustrating time variation of the toe angle command value and the toe angle target value. (b) is a time chart having correspondence to time variation in (a) for illustrating the toe angle command value, sign changes of respective toe angle command speed and the tracking error, and ON-OFF states of the steering direction change control, and the steering direction change control output value, the toe angle target sign, the angle command value of the rear wheel on the basis of at least a turning state OFF states of the hold control, a variation of the hold control output value, when the angle command value of the rear wheel on the basis of at least a turning state OFF states of the steering direction change control is ON.

As described above, the hold controller 57A is provided in the embodiment. In a case where the steering direction change control is in the ON state (when the control value CS1 is −1), when the sign of the toe angle command value $\alpha_{T1}$ is inconsistent with the sign of the last toe angle target value $\alpha_{T2A}$ (in FIG. 4, the sign of the toe angle target value $\alpha_{T2P}$ subjected to the primary delay correction), i.e., for example, when the sign of the toe angle target value $\alpha_{T2A}$ turns from plus to zero at the time t4B, the sign inconsistency determining unit 79 inputs the control value CS3 for making the hold control ON into the two value selecting unit 92 to cause the two value selecting unit 92 to switch to outputting the value of 0 (zero) by stopping outputting the value (−2) of $\Delta\alpha_{Tmax}$ (see the curve L4A in FIG. 7(a)). The sign inconsistency determining unit 79 determines that the sign determination result becomes not inconsistent and makes the hold control OFF, when the toe angle command value $\alpha_{T1}$ catches up zero at the time t4 while the angle command value of the rear wheel on the basis of at least a turning state of the steering direction change control is still kept and the toe angle target value $\alpha_{T2A}$ is kept zero (at the neutral position). In addition, a value of the control value CS1 outputted by the multiplier 65 becomes a value other than −1 (0 or +1), so that the steering direction change control becomes the OFF state.

After that, as shown by the curve L4A in FIG. 7(a), the tracking control is performed for the toe angle target value $\alpha_{T2A}$ toward the toe angle command value $\alpha_{T1}$ with the toe angle target changing quantity $\Delta\alpha_{T2}$ which is obtained by the min-max process for the value of the general tracking error $\Delta\alpha_{T1A}$. After that, when the toe angle command value $\alpha_{T1}$ encounters the steering direction change at the time t5, the control value CS1 outputted by the multiplier 65 becomes −1 similarly to that after the time t2. The two value selecting unit 66 inputs a value of the maximum changing quantity $\Delta\alpha_{Tmax}$ which is a value of +2 calculated by the multiplier 64 (corresponding to the steering direction change control output value in FIG. 7(b)) into one of the terminal of the two value selecting unit 92 (terminal 92c). In the two value selecting unit 92, the value inputted into the terminal 92c is inputted into the adder 58A as the toe angle target changing quantity $\Delta\alpha_{T2}$ and is added to the toe angle target value $\alpha_{T2P}$ subjected to the primary delay correction, and is inputted into the target current calculating unit 86 as the toe angle target value $\alpha_{T2A}$.

In addition, when the sign of the toe angle target value $\alpha_{T2A}$ changes from minus to zero at time t7B, the sign inconsistency determining unit 79 inputs the control value CS3 into the two value selecting unit 92 similar to the time t4B which makes the hold control ON. This causes the two value selecting unit 92 to switch to outputting a value of 0 (zero) by stopping outputting the value of (−2) as $\Delta\alpha_{Tmax}$ which the two value selecting unit 92 have outputted as the toe angle target changing quantity $\Delta\alpha_{T2}$ until then (see the curve L4A in FIG. 7(a)).

The sign inconsistency determining unit 79 determines that the sign determination result becomes not inconsistent and makes the hold control OFF, when the toe angle command value $\alpha_{T1}$ catches up zero at the time t7 while the angle command value of the rear wheel on the basis of at least a turning state of the steering direction change control is still kept and the toe angle target value $\alpha_{T2A}$ is kept zero (at the neutral position). In addition, the control value CS1 outputted by the multiplier 65 becomes a value other than −1 (0 or +1), so that the steering direction change control becomes in the OFF state.

After that, when the toe angle command value $\alpha_{T1}$ is kept zero, the toe angle target value $\alpha_{T2A}$ is subjected to the tracking control toward the toe angle command value $\alpha_{T1}$ with the toe angle target changing quantity obtained by that a general value of the tracking error $\Delta\alpha_{T1A}$ subjected to the min-max process. Accordingly, the toe angle target value $\alpha_{T2A}$ converges to zero (neutral position) without overshooting as shown in FIG. 6 at the time t7.

As described above, the hold controller 57A is installed to perform functions thereof, which provides the control of the actual toe angle $\alpha_1$ with a quick response characteristic when there is the steering direction change in the toe angle command value $\alpha_{T1}$ as well as can prevent the toe angle target value $\alpha_{T2A}$ which returns in the neutral direction prior to the toe angle command value $\alpha_{T1}$. In other words, it can prevent the actual toe angle $\alpha_1$ from overshooting up to an opposite direction to the left and right direction indicated by the toe angle command value $\alpha_{T1}$ as a result that the actual toe angle $\alpha_1$ tracks the toe angle target value $\alpha_{T2A}$.

As a result, according to the embodiment, the rear wheel steering control device without generation of a strange feeling due to delay of the vehicle behavior though the driver performs such a quick steering direction change that a quick steering direction change output of the toe angle command value $\alpha_{T1}$ (more specifically, the toe angle command values $\alpha_{T1L}, \alpha_{T1R}$).

<<Second Embodiment>>

Figure 8:
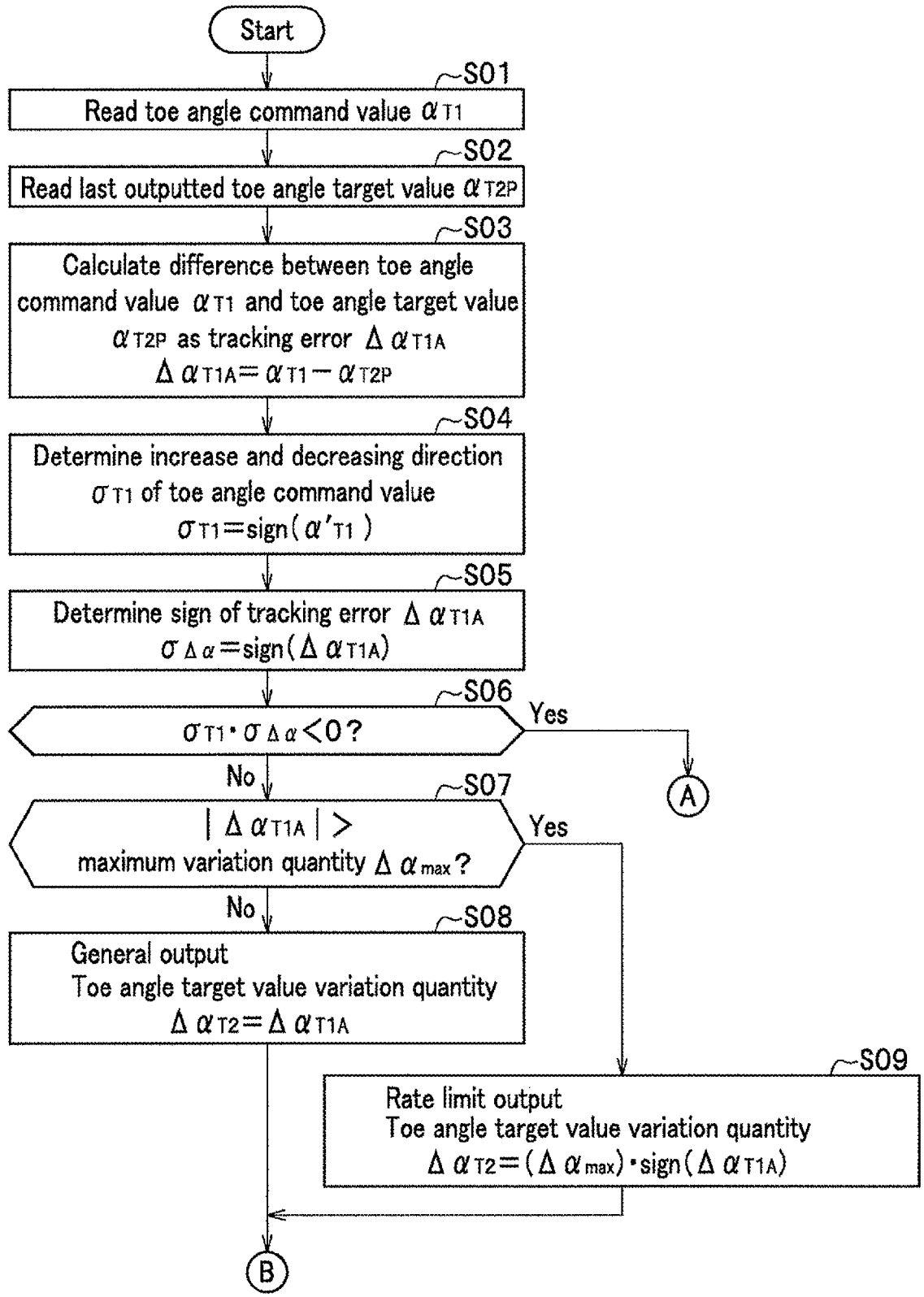
FIG. 8 is a flowchart illustrating a flow of control of updating the toe angle target value according to a second embodiment.
Figure 9:
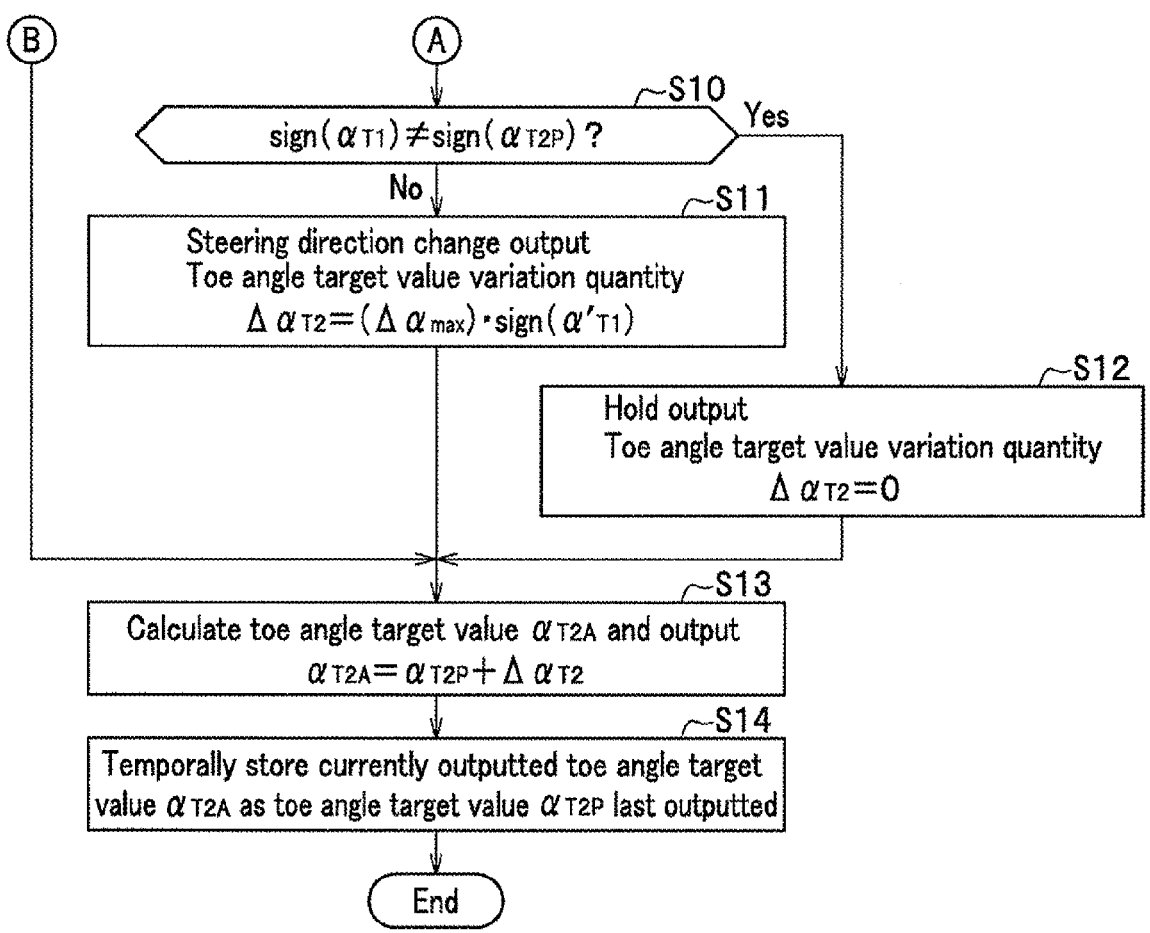
FIG. 9 is a flowchart illustrating a flow of control of updating the toe angle target value according to the second embodiment.

In the first embodiment described above, the toe angle target speed limiting unit 84A has been described with the functional block configuration as shown in FIG. 4. However, the invention is not limited to this. With reference to FIGS. 8 and 9 will be described a method of updating control (target value updating control) of the toe angle target value $\alpha_{T2A}$ for the toe angle command value $\alpha_{T1}$ in the rear wheel steering control device according to the second embodiment.

FIGS. 8 and 9 are flowcharts illustrating a flow of the updating control of the toe angle target value in the second embodiment.

The toe angle target speed limiting unit 84A in the second embodiment is a function provided by executing a program by a microcomputer of the controller 81A included in the toe angle changing control ECUs 37RA, 37LA as shown in FIG. 3. The updating control of the toe angle target value $\alpha_{T2A}$ is processed in the toe angle target speed limiting unit 84A at a predetermined period.

In the present embodiment, as similar to the first embodiment, to representatively describe the toe angle target speed limiting unit 84A for the toe angle changing control ECUs 37LA, 37RA, the toe angle command value $\alpha_{T1}$, the toe angle target value $\alpha_{T2A}$, the toe angle target value of the previous output $\alpha_{T2P}$, the tracking error $\Delta\alpha_{T1A}$, the toe angle target value change quantity $\Delta\alpha_{T2}$ are referred. Regarding the toe angle changing control ECU 37LA, specifically, the toe angle command value $\alpha_{T L1}$, the toe angle target value $\alpha_{T2LA}$, the toe angle target value of the previous output $\alpha_{T2PL}$, the tracking error $\Delta\alpha_{TL1A}$, and a toe angle target changing quantity $\Delta\alpha_{TL2}$. are meant. Regarding the tow angle changing control ECU 37Ra, specifically, the toe angle command value $\alpha_{T2RA}$, the toe angle target value of the previous output $\alpha_{T2PR}$, the tracking error $\Delta\alpha_{TR1A}$, and a toe angle target changing quantity $\Delta\alpha_{TR2}$ are meant.

In the step S01, the toe angle command value $\alpha_{T1}$ is calculated at a predetermined period in the toe angle command value operating unit 71 of a steering control ECU 130, and the toe angle command value which is outputted to the toe angle target speed limiting unit 84A of the two angle change control ECUs 37Ra, 37La is read out. In the step S02, the toe angle target value $\alpha_{T2P}$ which was previously outputted by the toe angle target speed limiting unit 84A is read out. The toe angle target value $\alpha_{T2P}$ last outputted is temporarily stored in a step S14 described later in the previous processing in the repeated process.

In a step S03, a difference between the toe angle command value $\alpha_{T1}$ and the toe angle target value $\alpha_{T2P}$ is calculated as the tracking error $\Delta\alpha_{T1A}$ ($\Delta\alpha_{T1A}=\alpha_{T1}-\alpha_{T2P}$). In a step S04, an increase and decrease direction $\sigma_{T1}$ of the toe angle command value $\alpha_{T1}$ is determined $\{\sigma_{T1}=\text{sign}(\alpha'_{T1})\}$. Here, $\alpha'_{T1}$ is a time differential value of the toe angle command value which indicates the toe angle command value speed $\alpha'_{T1}$ in the first embodiment. Regarding this, a sign function is a function for sign determination outputting −1 when the numeral value is negative, +1 when the numeral value is positive, and 0 (zero) when the numeral value is 0 (zero).

In a step S05, a sign $\sigma_{\Delta\alpha}$ of the tracking error $\Delta\alpha_{T1A}$ is determined $\{\sigma_{\Delta\alpha}=\text{sign}(\Delta\alpha_{T1A})\}$. In a step S06, it is checked whether a product of the sign $\sigma_{T1}$ determined in the step S04 and the sign $\sigma_{\Delta\alpha}$ determined in the step S05 is a negative value or not ($\lceil\sigma_{T1}\cdot\sigma_{\Delta\alpha}<0?\rceil$). When the product of the sign $\sigma_{T1}$ and the sign $\sigma_{\Delta\alpha}$ is negative (Yes), processing proceeds to a step S10 in FIG. 9 in accordance with a connector (A). When the product of the signs $\sigma_{T1}$ and $\sigma_{\Delta\alpha}$ 0 (zero) or more (No), the processing proceeds to a step S07.

In a step S07, it is checked whether an absolute value of the tracking error $\Delta\alpha_{T1A}$ is greater than a predetermined positive value $\Delta\alpha_{max}$ ($\lceil|\Delta\alpha_{T1A}|>$maximum changing quantity $\Delta\alpha_{max}?\rceil$).

When the absolute value of the tracking error $\Delta\alpha_{T1A}$ is greater than the predetermined positive value $\Delta\alpha_{max}$ (yes), processing proceeds to a step S09, instead, (No), to a step S08.

In the step S08, the toe angle target value change quantity $\Delta\alpha_{T2}$ is outputted as a general output which is not subjected to the max-min process. More specifically, the toe angle target value change quantity $\Delta\alpha_{T2}$ is defined as the tracking error $\Delta\alpha_{T1A}$ calculated in the step S03 ($\Delta\alpha_{T2}=\Delta\alpha_{T1A}$). In a step S09, the toe angle target changing quantity $\Delta\alpha_{T2}$ is defined as a rate limit output which is obtained by that the toe angle target value change quantity $\Delta\alpha_{T2}$ subjected to the max-mini process. More specifically, the toe angle target value change quantity $\Delta\alpha_{T2}$ is determined as the value obtained by attaching a sign of $\Delta\alpha_{T1A}$ to the above-described predetermined positive value to $\Delta\alpha_{max}$ $\{\Delta\alpha_{T2}=(\Delta\alpha_{max})\cdot\text{sign}(\Delta\alpha_{T1A})\}$.

After the steps S08 and S09, processing proceeds to a step S13 in FIG. 9 in accordance with the connector (B).

When processing proceeds to the step S10 from the step S06 in accordance with the connector (A), it is checked whether the sign of the toe angle command value $\alpha_{T1}$ agrees with the sign of the toe angle target value $\alpha_{T2P}$ previously outputted in the step S02 ($\lceil\text{sign}(\alpha_{T1})\neq\text{sign}(\alpha_{T2P})?\rceil$).

When the sign of the toe angle command value $\alpha_{T1}$ does not agree with the sign of the toe angle target value $\alpha_{T2P}$ previously outputted (Yes), processing proceeds to a step S12. In disagreement (No), processing proceeds to a step S11. In the step S11, the toe angle target value change quantity $\Delta\alpha_{T2}$ is outputted to change the direction at a maximum speed. More specifically, the toe angle target value change quantity $\Delta\alpha_{T2}$ is determined as a value obtained by attaching the sign of the toe angle command value speed $\alpha'_{T1}$ to the above-described predetermined positive value $\Delta\alpha_{max}$ $\{\Delta\alpha_{T2}=(\Delta_{max})\cdot$ sign($\alpha'_{T1}$)$\}$. In the step S12, the toe angle target changing quantity $\Delta\alpha_{T2}$ is determined as a hold output. More specifically, the toe angle target changing quantity $\Delta\alpha_{T2}$ is made zero ($\lceil$toe angle target value change quantity $\Delta\alpha_{T2}$=0$\rceil$).

After the steps S11 and S12, processing proceeds to a step S13.

In the step S13, the toe angle target value $\alpha_{T2A}$ is calculated and supplied to the target current calculating unit 86 ($\lceil\alpha_{T2A}=\alpha_{T2P}+\Delta\alpha_{T2}\rceil$). More specifically, the toe angle target value change quantity $\alpha\Delta_{T2}$ set in either of the steps S08, S09, S11, or S12 is added to the toe angle target value $\alpha_{T2P}$ previously outputted, read out in the step S02 as a currently outputted toe angle target value $\alpha_{T2A}$. In a step S14, the toe angle target value $\alpha_{T2A}$ which is determined as the currently outputted toe angle target value $\alpha_{T2A}$ in the step S13 is temporally stored as a toe angle target value $\alpha_{T2P}$ last outputted.

As described above, in the toe angle target speed limiting unit 84A, a series repeated process for setting the toe angle target value $\alpha_{T2A}$ finishes.

The step S04 in the flowcharts in FIGS. 8 and 9 corresponds to "command value increase and decrease direction determining means" recited in Claims, and the steps S05 to S09 corresponds to "target value speed limiting means for setting a first target value change quantity". The steps S10 and S11 correspond to "during-steering direction-changing target value change quantity setting means". Particularly, the steps S06, S10 correspond to "during-steering direction-changing neutral detection means". The step S12 corresponds to "holding means", and the step S13 corresponds to "output selecting means" and "target value setting updating means".

According to the embodiment, as similar to the above-described first embodiment, as shown in FIG. 7(a), when the toe angle target value $\alpha_{T2A}$ is set and controlled toward the curve L4A in accordance with the curve L1 indicating variation of the toe angle command value $\alpha_{T1}$ to have variation, at the time t2 and t5, processing proceeds to steps S10, S11 where the toe angle target value change quantity $\Delta\alpha_{T2}$ is determined as a predetermined value (maximum value) $\Delta\alpha_{max}$. In other words, the toe angle target value $\alpha_{T2A}$ can be changed toward the neutral direction in which the toe angle command value $\alpha_{T1}$ varies at a maximum speed of the actuators 30L, 30R. Accordingly, the steering direction change can be controlled at an earlier timing than the case of the prior art shown in FIG. 5 in the control for setting the toe angle target value $\alpha_{T2A}$. In addition, in the target current calculating unit 86 (see FIG. 3), the steering angle change control can be performed for the actual toe angle $\alpha_1$ to track the toe angle target value $\alpha_{T2A}$ at the maximum speed correspondingly to the steering direction change control for the toe angle command value $\alpha_{T1}$.

In addition, processing proceeds from the step S10 to the step S12 where the value of the toe angle target value $\alpha_{T2A}$ is held as the toe angle target value change quantity $\Delta\alpha_{T2}$=0, when the toe angle target value $\alpha_{T2A}$ reaches the neutral position earlier than the toe angle command value $\alpha_{T1}$ because the toe angle target value $\alpha_{T2A}$ proceeds after the time t2 when the steering direction change control is started or after the time t5 as shown in FIG. 7(a).

As described above, when there is the steering direction change in the toe angle command value $\alpha_{T1}$, control of the actual toe angle $\alpha_1$ with a quick response can be provided by that the processing proceeds to the step S11 from the step S10 as well as processing proceeds from the step S10 to the step S12, which prevents the toe angle target value $\alpha_{T2A}$ which returns to the neutral position prior to the toe angle command value $\alpha_{T1}$ from overshooting across the neutral position. In other words, it is prevented that the actual toe angle $\alpha_1$ overshoots up to a direction opposite to the left and right direction indicated by the toe angle commend value $\alpha_{T1}$ because the actual toe angle $\alpha_1$ track the toe angle target value $\alpha_{T2A}$.

As a result, according to the embodiment, though the driver performs a quick steering direction change steering such that a quick steering direction change output is developed in the toe angle command value $\alpha_{T1}$ (more specifically, the toe angle command values $\alpha_{T1L}$, $\alpha_{T1R}$), the rear wheel steering control device can be provided without occurrence of a strange feeling due to a delay of vehicle's behavior.

<<Third Embodiment>>

Figure 10:
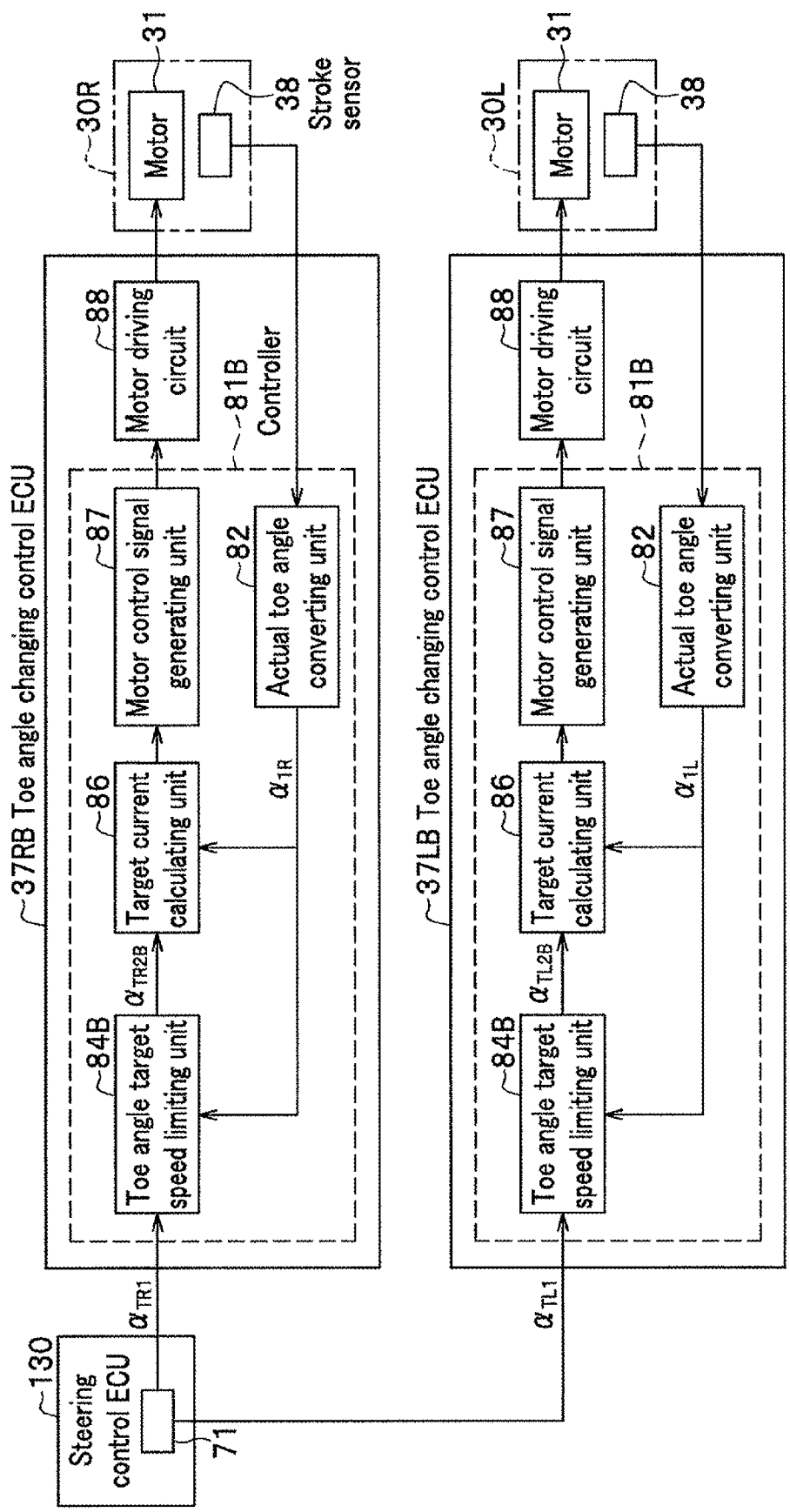
FIG. 10 is a functional block diagram of the toe angle change control ECU according to a third embodiment.
Figure 11:
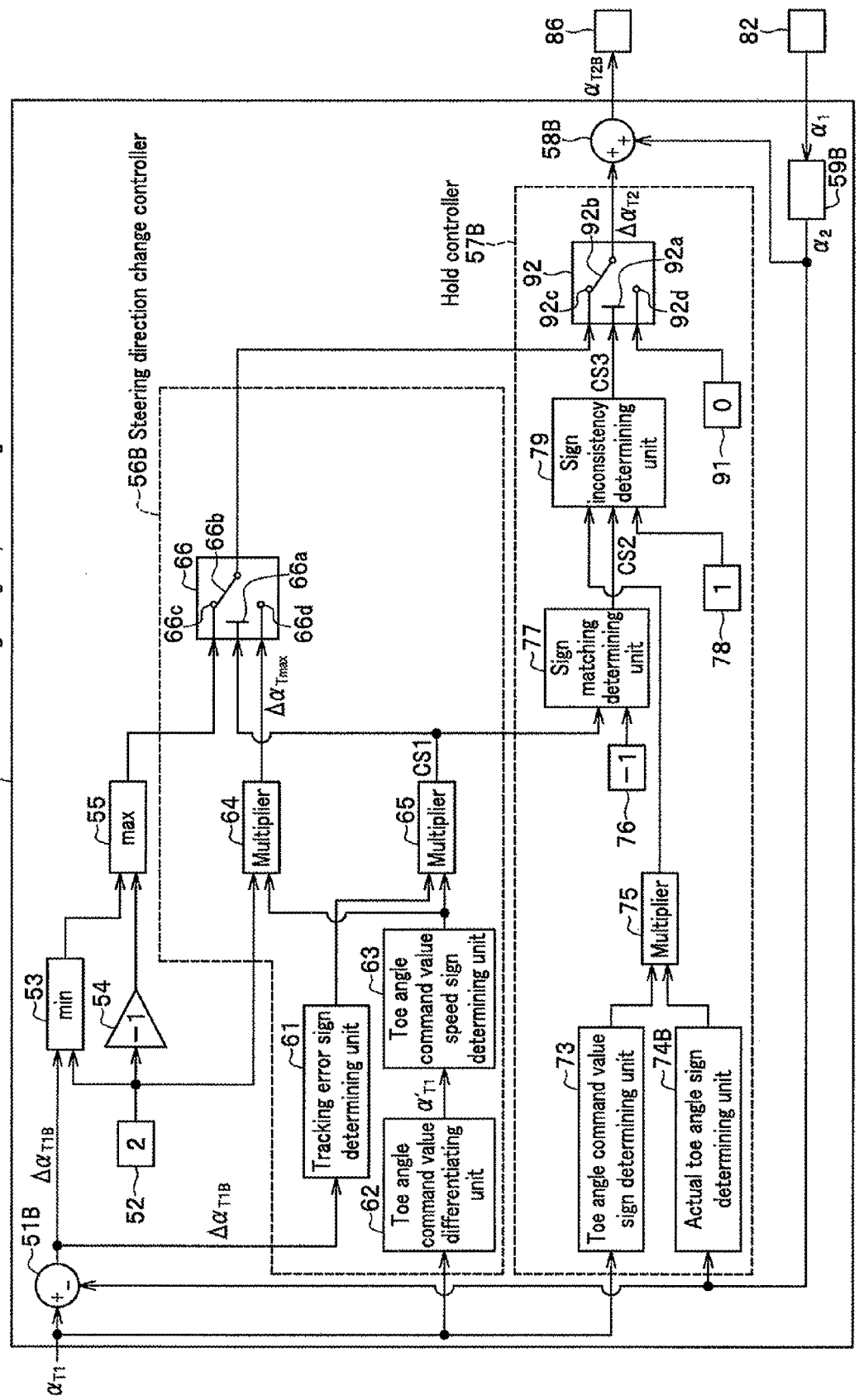
FIG. 11 is a detailed functional block diagram of a toe angle target speed limiting unit in the toe angle change control ECU according to the third embodiment.

Next, with reference to FIGS. 1, 2, 10, and 11, occasionally, FIGS. 3, 4, will be described the rear wheel steering control device according to a third embodiment of the present invention. FIG. 10 is a functional block diagram of the toe angle change control ECU in the third embodiment. FIG. 11 is a functional block diagram for illustrating details of the toe angle target speed limiting part in the toe angle change control ECU in the third embodiment.

In the third embodiment, the toe angle change control ECUs 37LA, 37RA shown in FIGS. 1 and 2 in the first embodiment are replaced with the toe angle change control ECUs 37LB, 37RB.

Particularly, in the controller 81A in the toe angle change control ECU 37LA in the first embodiment as shown in FIG. 3, the actual toe angle $\alpha_{1L}$ is not inputted into the toe angle target speed limiting unit 84A calculated in the actual toe angle converting unit 82. On the other hand, in the controller 81A in the toe angle change control ECU 37LB in the third embodiment as shown in FIG. 10, the actual toe angle $\alpha_{1L}$ is also inputted into the toe angle target speed limiting unit 84B.

Similarly, in the toe angle change control ECU in the first embodiment, as shown in FIG. 3, the actual toe angle $\alpha_{1R}$ calculated in the actual toe angle converting unit 82 is not inputted into the toe angle target speed limiting unit 84A, but in the controller 81A in the toe angle change control ECU 37RB in the third embodiment, as shown in FIG. 10, is also inputted into the toe angle target speed limiting unit 84B.

In addition, in the actual toe angle target speed limiting unit 84B in the third embodiment, the subtractor 51A, the steering direction change controller 56A, the hold controller 57A, the adder 58A, and the primary delay correcting unit 59A in the first embodiment are, as shown in FIG. 11, replaced with a subtractor 51B, a steering direction change controller 56B, the hold controller 57B, an adder 58B, and a primary delay correcting unit 59B.

Hereinafter the same configurations as those in the first embodiment are designated with the same references, and thus only different configurations from the first embodiment will be described without a duplicated description.

The subtractor 51B subtracts the actual toe angle $\alpha_2$ (hereinafter simply referred to as "actual toe angle $\alpha_2$") subjected to the primary delay correction for the actual toe angle $\alpha_1$ from the actual toe angle converting unit 82 from the actual toe angle command value $\alpha_{T1}$ inputted from the toe angle command value operating unit 71 to calculate a tracking error $\Delta\alpha_{T1B}$ which is inputted into the minimum value selecting unit 53 and the tracking error sign determining unit 61 in the steering direction change controller 56.

The subtractor 51B has the same configuration as the subtractor 51A in the first embodiment, but different in that a signal inputted into the tracking error sign determining unit 61 is a tracking error $\Delta\alpha_{T1B}$.

The adder 58B adds the actual toe angle $\alpha_2$ subjected to the primary delay correction from the primary delay correcting unit 59B to the toe angle target value changing quantity $\Delta\alpha_{T2}$ outputted from the hold controller 57B and inputs the toe angle target value $\alpha_{T2B}$ into the target current calculating unit 86. Here, a correction constant in the primary delay correcting unit 59B is set mainly in consideration of the time constants of the motor driving circuit 88 and the motor 31 and the reduction ratio of the reducer of the actuator 30 (indicated as 30L, 30R in FIG. 3).

In addition, the hold controller 57B in the embodiment, in place of the target toe angle sign determining unit 74A in the hold controller 57A in the first embodiment, includes an actual toe angle sign exterminating determining unit 74B. The actual toe angle sign determining unit 74B is supplied with the actual toe angle $\alpha_2$ (more specifically, an actual toe angle $\alpha_{2L}$, $\alpha_{2R}$ (not shown)) subjected to the primary delay correction from the primary delay correcting unit 59B and determines a sign of the actual toe angle $\alpha_2$ among plus, zero, and minus and inputs either of +1, 0, −1 into the multiplier 75 correspondingly.

Here, the toe angle change control ECUs 37LB, 37RB and the toe angle command value calculating unit 71 form "control means in the rear wheel steering control device" recited in Claims, and particularly the toe angle change control ECUs 37LB, 37RB correspond to "actuator control means" recited in Claims. In addition, the stroke sensor 38 corresponds to "rear wheel actual steering angle obtaining means, actual toe angle information obtaining means", and expansion and contraction quantities of the lead screw of the actuators 30L, 30R corresponds to "information regarding the actual steering angle and information regarding the actual toe angle of the rear wheel" recited in Claims.

In addition, the toe angle command value $\alpha_{T1}$ corresponds to "steering angle command value of the rear wheel", the toe angle target value $\alpha_{T2B}$ corresponds to "steering angle target value", and the toe angle target value changing quantity $\Delta\alpha_{T2}$ corresponds to "steering angle target value changing quantity". In addition, the toe angle command value differentiating unit 62 of the steering direction change controller 56B, and the toe angle command value speed sign determining unit 63 correspond to "command value increase and decrease direction determining means".

In addition, the subtractor 51B, the constant value outputting unit 52, the minimum value selecting unit 53, the fixed gain calculating unit 54, the maximum value selecting unit 55, the tracking error sign determining unit 61, the multiplier 64, the multiplier 65, the two value selecting unit 66, the hold controller 57B, and the adder 58B correspond to "target value setting updating means" in claims.

In addition, similarly to the first embodiment, the subtractor 51B, the constant value outputting unit 52, the minimum value selecting unit 53, the fixed gain calculating unit 54, and the maximum value selecting unit 55 correspond to "target value speed limiting means" and the tracking error sign determining unit 61, the multiplier 64, the steering direction change controller 56 correspond to "during-steering direction-changing target value change quantity setting mean", and the two value selecting unit 66 corresponds to "output selecting means", and the adder 58B corresponds to "target value setting updating means".

Figure 12:
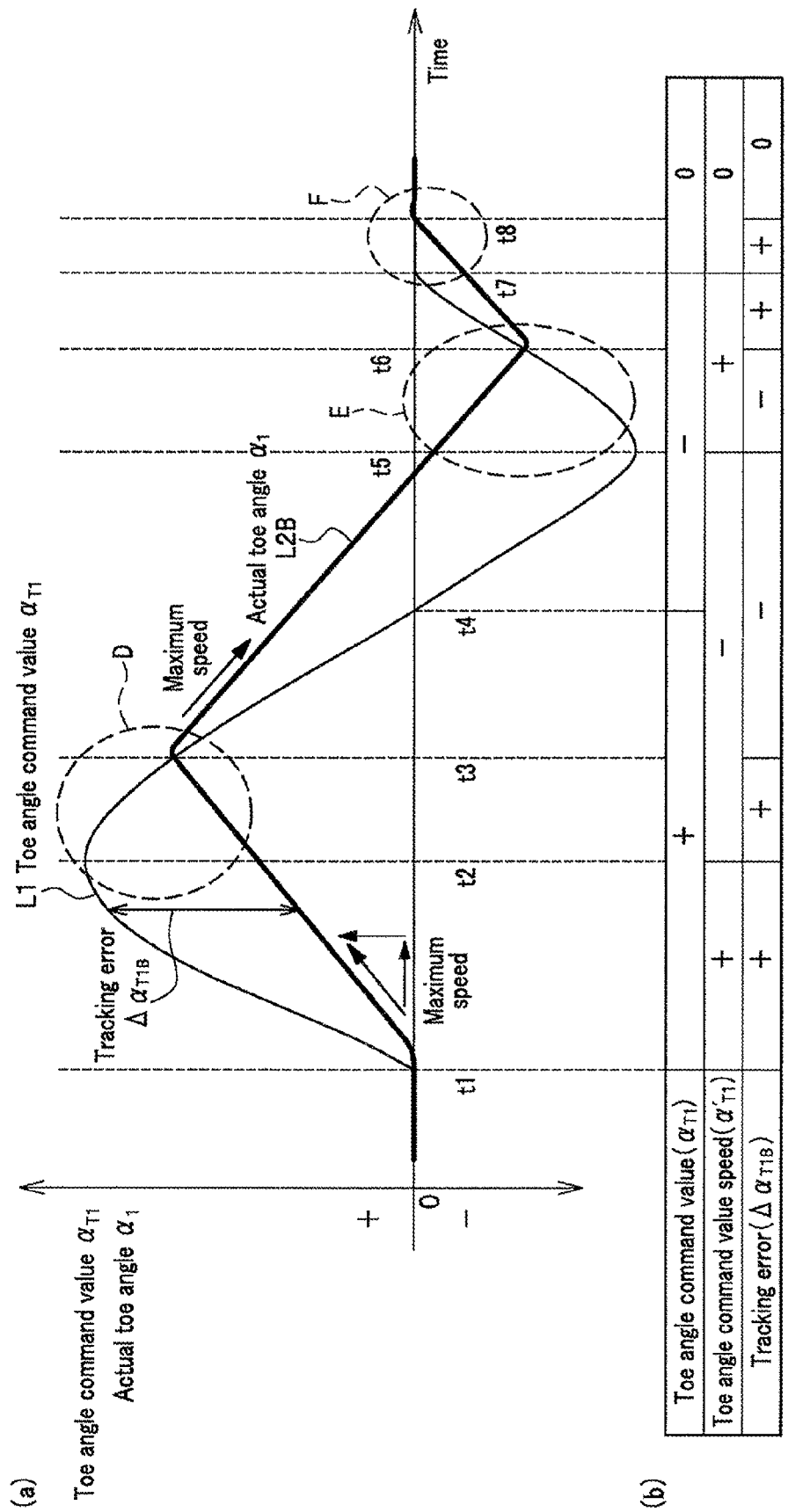
FIG. 12 is an illustration of describing an operation of control in a toe angle direction change according to prior art.
Figure 13:
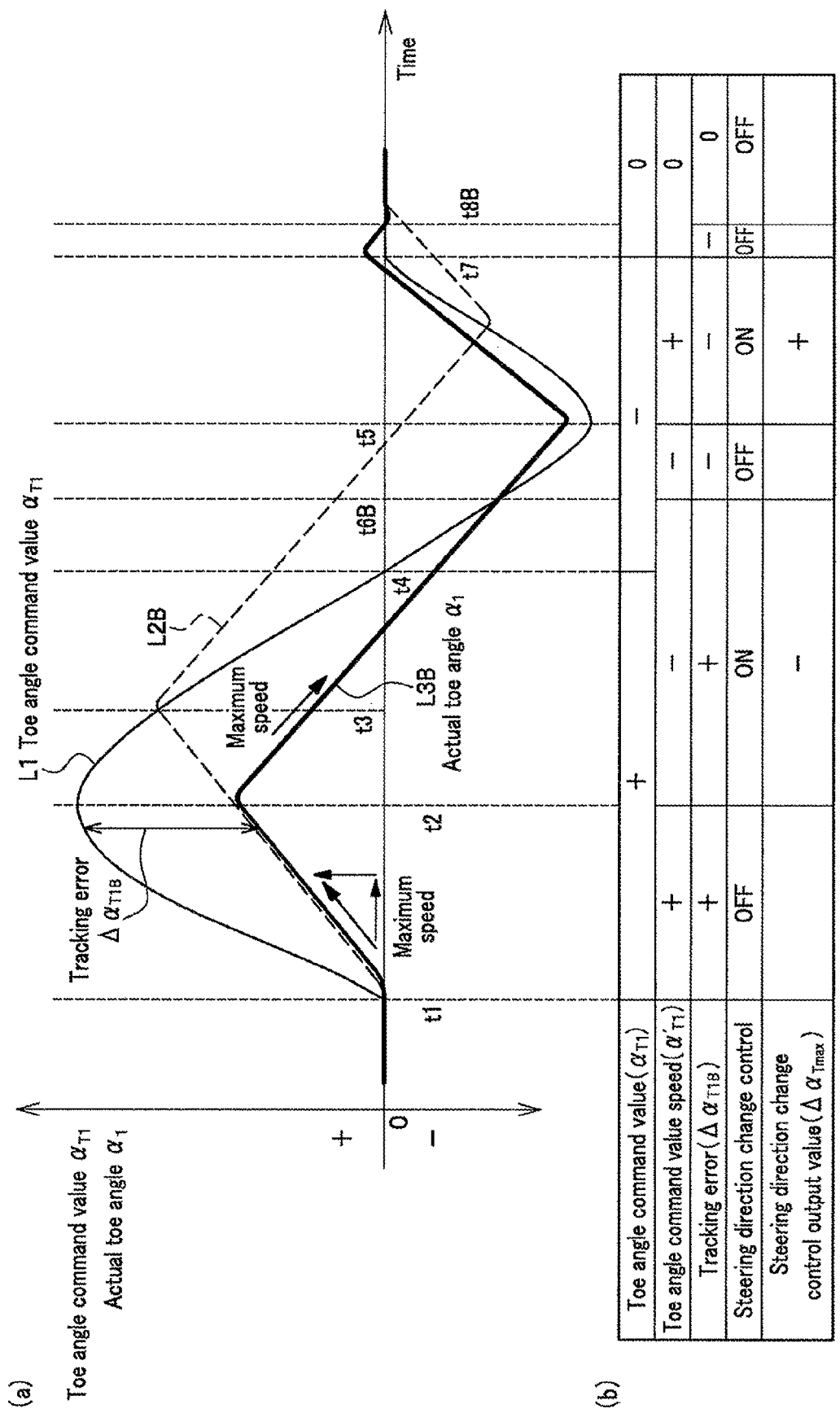
FIG. 13 is an illustration of describing control in a toe angle direction change.
Figure 14:
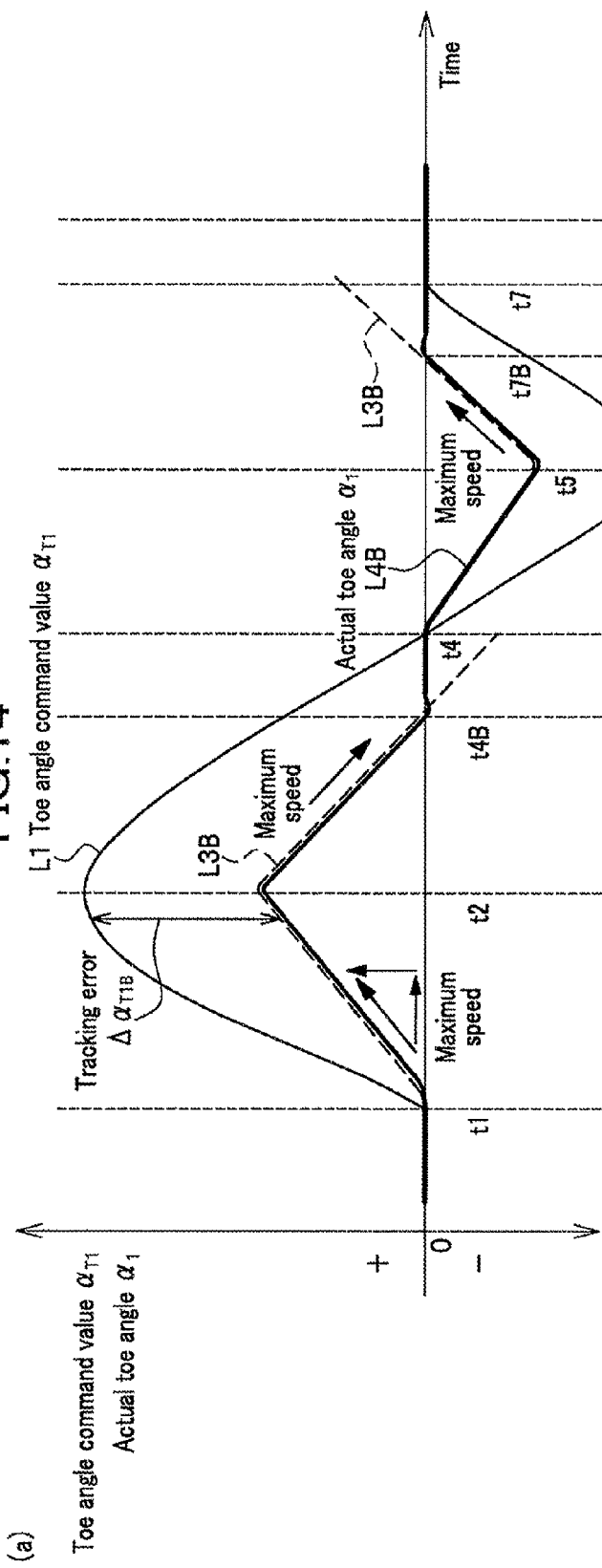
FIG. 14 is an illustration of describing an operation of holding control after the toe angle direction change control.

With reference to FIGS. 12 to 14 will be described an operation of the embodiment. FIG. 12 is an operation describing drawing of a prior art control while a toe angle direction is change. (a) is an illustrative drawing illustrating time variation of the toe angle command value and the actual toe angle. (b) is a time chart having correspondence to time variation (a) for showing sign variation in the toe angle command value, the toe angle command value speed, and the tracking error. In the prior art, in a case where the reduction ratio in the actuators 30L, 30R is large, when the tracking error $\Delta\alpha_{T1B}$ becomes large because as shown by the curve L2B, the toe angle command value $\alpha_{T1}$ varies from the time t1 at a speed equal to or greater than a predetermined speed, the toe angle target value change quantity (toe angle target speed) is set to the upper limit value (corresponding to the value "2" of the maximum changing quantity in the embodiment) to cause the actual toe angle $\alpha_1$ to track the toe angle command value $\alpha_{T1}$. Next, the actual toe angle $\alpha_1$ is caused to track in accordance with the tracking error $\Delta\alpha_{T1B}$ of which sign becomes opposite after the actual toe angle $\alpha_1$ catch up the toe angle command value $\alpha_{T1}$ at time t3. In such a control, though the toe angle command value $\alpha_{T1}$ changes in direction opposite to that before the time t2 in a part D, the actual toe angle $\alpha_1$ is controlled in the direction which is kept same as that before the time t2, which gives a strange feeling to the driver.

This is true at the part E in the control from time t4 to time t7 in FIG. 12. In addition, in the conventional control, there is a problem that a strange feeling is given to the driver because though the toe angle command value $\alpha_{T1}$ returns to zero (neutral position) as time from t7 to t8 at a part F, the actual toe angle $\alpha_1$ has not returned to zero immediately, so that there is a tracking delay, which continue a turning motion the vehicle.

Next, with reference to FIG. 13 will be described a tracking control method of the actual toe angle $\alpha_1$ on the steering angle changing in the embodiment. FIG. 13 is an illustrative drawing illustrating the toe angle steering direction change control. (a) is an illustrative drawing showing time variation of the toe angle command value and the actual toe angle. (b) is a time chart with correspondence with the time passing in (a) showing variations of the toe angle command value, sign changes of respective toe angle command value speed and the tracking error, ON-OFF states of the steering direction change, and steering direction change control output value when the steering direction change control is in the angle command value of the rear wheel on the basis of at least a turning state.

According to the embodiment, when the tracking error $\Delta\alpha_{T1B}$ becomes large because the toe angle command value $\alpha_{T1}$ varies at a speed equal to or greater than a predetermined speed as shown by the curve L3B in FIG. 13(a), the maximum value selecting unit 55 sets the toe angle target value change quantity $\alpha_{T2}$ (toe angle target speed) to a upper limit value (corresponding to the value "2" of the maximum changing quantity of the embodiment) to cause the actual toe angle $\alpha_1$ to track the toe angle command value $\alpha_{T1}$.

After that, at time t2, when the toe angle command value $\alpha_{T1}$ changes (subjected to steering direction change), in an opposite direction to that before the time 2, the control value CS1 outputted by the multiplier 65 becomes a value of −1 (corresponding to the steering direction change control output value in FIG. 13(b). The two value selecting unit 66 inputs a value generated by the multiplier 64 of the maximum changing quantity $\Delta\alpha_{Tmax}$, i.e. −2, into one terminal (terminal 92c) of the two value selecting unit 92. In the two value selecting unit 92, the value inputted into the terminal 92c is inputted into the adder 58B as the toe angle target value change quantity $\Delta\alpha_{T2}$ and is added to the actual toe angle $\alpha_2$ subjected to the primary delay correction and inputted into the target current calculating unit 86 as the target toe angle $\alpha_{T2B}$. As described, when the toe angle command value $\alpha_{T1}$ encounters the steering direction change at the time t2, it is immediately set to a maximum changing quantity $\Delta\alpha_{Tmax}$ having the same sign as the toe angle command value variation speed $\alpha'_{T1}$. More specifically, a control is made to change the actual toe angle $\alpha_1$ at time t2 at a maximum speed toward the neutral direction. As a result, the steering direction change control on the actual toe angle $\alpha_1$ at an earlier timing than the prior art in which the tracking error $\Delta\alpha_{T1B}$ subjected to the min-max process in accordance with the tracking error $\Delta\alpha_{T1B}$ is used as the toe angle target value change quantity $\Delta\alpha_{T2}$. Accordingly, in a turning motion of a vehicle associated with steering direction change of the rear wheel, the toe angle of the rear wheel can be controlled without giving any strange feeling to the driver.

In addition, if the control is allowed as it is, because the steering direction change control is in an ON state until time t6B, there may be a case where the actual toe angle α1 turns to the left direction earlier than the direction indicated by the toe angle command value $\alpha_{T1}$. To correct this is a function of the hold controller 57B (see FIG. 11).

Regarding this, when there is not the function of the hold controller 57B, as shown by the curve L3B in FIG. 13, the sign of the tracking error $\Delta\alpha_{T1B}$ becomes negative after time t6B, agreeing with a minus sign of the toe angle command value speed $\alpha'_{T1}$, so that the steering direction change control becomes firstly OFF. In addition, from time t6B to time t5, the actual toe angle $\alpha_1$ is tracked and controlled toward the toe angle command value $\alpha_{T1}$ at a toe angle target value change quantity $\Delta\alpha_{T2}$ which is obtained by that the general tracking error $\Delta\alpha_{T1B}$ is subjected to the min-max process. After that, when the toe angle command value $\alpha_{T1}$ encounters the steering direction change at time t5, as similar to that after time t2, the control value CS1 outputted by the multiplier 65 becomes a value of −1, and the value of the maximum changing quantity $\Delta\alpha_{Tmax}$, i.e. a value of +2, is inputted into one of the terminal of the two value selecting unit 92 (terminal 92c). In the two value selecting unit 92, the value inputted into the terminal 92c is inputted as the toe angle target value change quantity $\Delta\alpha_{T2}$ into the adder 58B and added to the actual toe angle $\alpha_2$ subjected to the primary delay correction there and inputted into the target current calculating unit 86 as the target toe angle $\alpha_{T2B}$. As described above, when the toe angle command value $\alpha_{T1}$ encounters the steering direction change at time t5, immediately the maximum changing quantity $\Delta\alpha_{Tmax}$ having the same sign as the toe angle command value variation speed $\alpha'_{T1}$ is set. More specifically, at the time t5, a control is made for changing the actual toe angle $\alpha_1$ toward the neutral direction at a maximum speed.

In addition, when the toe angle command value $\alpha_{T1}$ returns to zero after time t7, the control value CS1 outputted by the multiplier 65 at that time becomes 0, which makes the steering direction change control in the steering direction change controller 56B OFF, which causes the actual toe angle $\alpha_1$ to converge at zero with the toe angle target value change quantity $\Delta\alpha_{T2}$ subjected to the general min-max process. Accordingly, there left the problem only by the function of the steering direction change controller 56B in that the actual toe angle $\alpha_1$ overshoots the toe angle command value $\alpha_{T1}$ after the steering direction change control becomes in the ON state.

In addition, in FIG. 13(a), the curve L2B shown in FIG. 12(a) is also described for reference.

Next with reference to FIG. 14, will be described a hold control method after the steering direction change in the toe angle command value $\alpha_{T1}$ in the embodiment. FIG. 14 is an illustrative drawing for illustrating an operation of the hold control after the toe angle steering direction change control, (a) is a drawing for illustrating time variation of the toe angle command value and the toe angle target value, and (b) is a time chart having correspondence to time variation in (a) for illustrating the toe angle command value, the toe angle command value speed, and the sign changes of respective toe angle command speed and the tracking error, and ON-OFF states of the steering direction change control, and the steering direction change control output value, the actual toe angle sign, the ON-OFF states of the hold control, a variation of the hold control output value when the steering direction change control is in the ON state.

As described above, the hold controller 57B is provided in the embodiment. In a case where the steering direction change control is in the ON state (when the control value CS1 is −1), when the sign of the actual toe angle $\alpha_1$ is inconsistent with the sign of the last toe angle target value $\alpha_2$ (in FIG. 11, the sign of the toe angle target value $\alpha_2$ subjected to the primary delay correction), i.e., for example, when the sign of the actual toe angle $\alpha_1$ turns from plus to zero at the time t4B, the sign inconsistency determining unit 79 inputs the control value CS3 for making the hold control ON into the two value selecting unit 92. In response to this, the two value selecting unit 92 stops having outputted a value (−2) of $\Delta\alpha_{Tmax}$ as the toe angle target value change quantity $\Delta\alpha_{T2}$ by then and switches to outputting a value of 0 (zero) (see a curve L4B in FIG. 14(a)). While the angle command value of the rear wheel on the basis of at least a turning state of the steering direction change control still continues, the actual toe angle α1 is kept at zero (neutral position), when the sign inconsistency determining unit 79 determines that the sign determination result becomes not disagreement because the toe angle command value $\alpha_{T1}$ catches up zero at the time t4, the sign inconsistency determining unit 79 turns OFF the hold control. In addition, substantially at the same time, the control value CS1 outputted by the multiplier 65 becomes a value other than −1 (0 or +1), and the steering direction change control becomes in an OFF sate.

After that, as shown by the curve L4B in FIG. 14(a), the tracking control is performed for the actual toe angle $\alpha_1$ toward the toe angle command value $\alpha_{T1}$ with the toe angle target value changing quantity $\Delta\alpha_{T2}$ which is obtained by the min-max process for the value of the general tracking error $\Delta\alpha_{T1B}$. After that, when the toe angle command value $\alpha_{T1}$ encounters the steering direction change at the time t5, like after the time t2, the control value CS1 outputted by the multiplier 65 becomes a value of −1, and the two value selecting unit 66 inputs the maximum changing quantity $\Delta\alpha_{Tmax}$ which is the value of +1 calculated by the multiplier 64 (corresponding to the steering direction change control output value in FIG. 14(b)) into one terminal of the two value selecting unit 92 (the terminal 92c). In response to this the two value selecting unit 92 inputs into the adder 58B the value inputted into the terminal 92c as the toe angle target value change quantity $\Delta\alpha_{T2}$ which is added to the actual toe angle $\alpha_2$ subjected to the primary delay correction into the target current calculating unit 86 as the toe angle target value $\alpha_{T2B}$.

In addition, at a time t7b, like the time t4B when a sign of the actual toe angle $\alpha_1$ turns to zero from minus, the sign inconsistency determining unit 79 inputs the control value CS3 indicating that the hold control is in the angle command value of the rear wheel on the basis of at least a turning state into the two value selecting unit 92. In response to this, the two value selecting unit 92 stops having outputted a value (−2) of $\Delta\alpha_{Tmax}$ as the toe angle target value change quantity $\Delta\alpha_{T2}$ by then and switches to outputting a value of 0 (zero) (see a curve L4B in FIG. 14(a)). While the angle command value of the rear wheel on the basis of at least a turning state of the steering direction change control still continues, the actual toe angle α1 is kept at zero (neutral position), when the sign inconsistency determining unit 79 determines that the sign determination result becomes not disagreement because the toe angle command value $\alpha_{T1}$ catches up zero at the time t7, the sign inconsistency determining unit 79 turns OFF the hold control. In addition, substantially at the same time, the control value CS1 outputted by the multiplier 65 also becomes a value other than −1 (0 or +1), and the steering direction change control becomes in an OFF sate.

After that, when the toe angle command value $\alpha_{T1}$ is kept at zero, the actual toe angle $\alpha_1$ is controlled to track the toe angle commend value $\alpha_{T1}$ with the toe angle target value change quantity $\Delta\alpha_{T2}$ which is obtained from a value of the general tracking error $\Delta\alpha_{T1B}$ by the min-max process. Accordingly, the actual toe angle $\alpha_1$ converges at zero (neutral position) without overshoot as shown at the time t7 in FIG. 12.

As described above, the hold controller 57B is installed to perform functions thereof, which provides the control of the actual toe angle $\alpha_1$ with a quick response characteristic when there is the steering direction change in the toe angle command value $\alpha_{T1}$ as well as can prevent the actual toe angle $\alpha_1$, which excessively advances the toe angle command value $\alpha_{T1}$, from overshooting up to an opposite direction to the left and right direction indicated by the toe angle command value $\alpha_{T1}$.

As a result, according to the embodiment, though the driver performs a quick steering direction change steering such that a quick steering direction change output is developed in the toe angle command value $\alpha_{T1}$ (more specifically, the toe angle command values $\alpha_{T1L}$, $\alpha_{T1R}$), the rear wheel steering control device can be provided without occurrence of a strange feeling due to a delay of vehicle's behavior.

<<Fourth Embodiment>>

Figure 15:
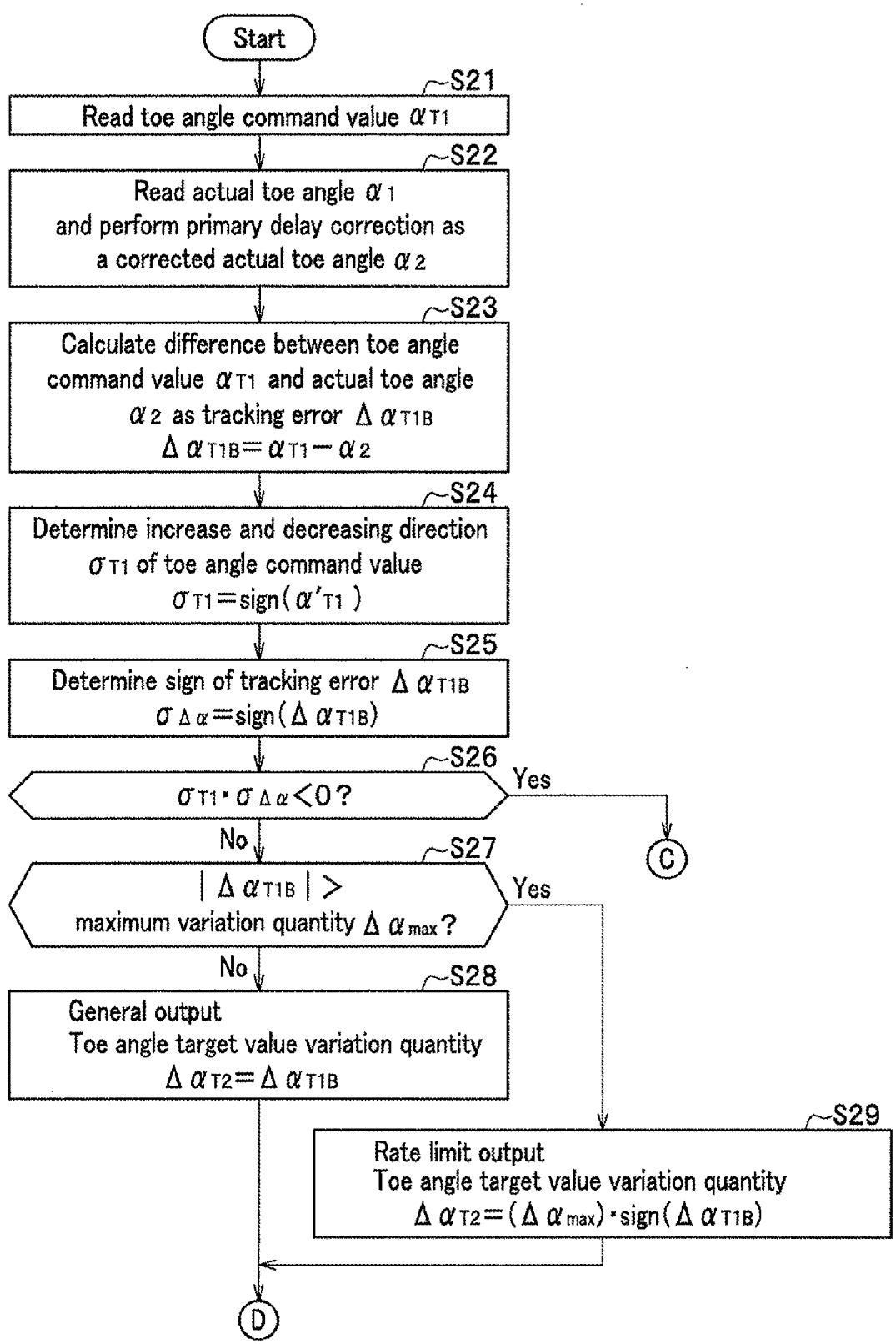
FIG. 15 is a flowchart illustrating a flow of control of updating the toe angle target value according to a fourth embodiment.
Figure 16:
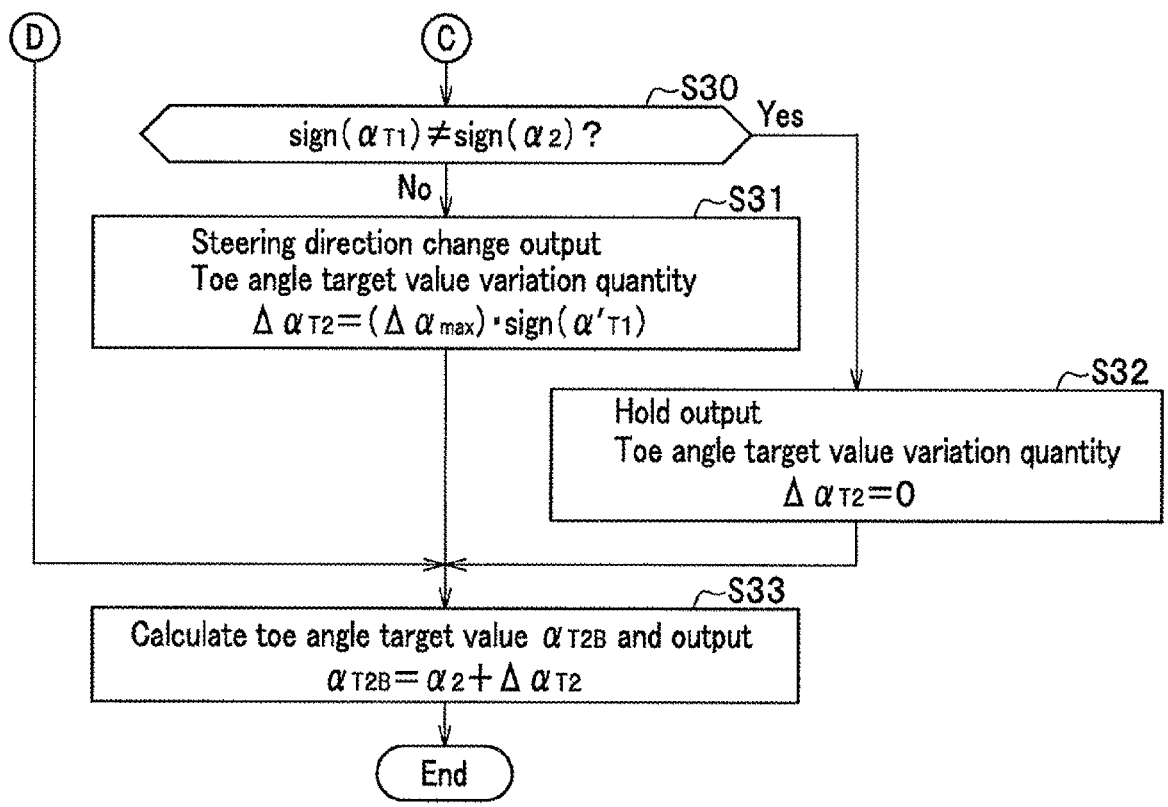
FIG. 16 is a flowchart illustrating a flow of control updating the toe angle target value according to the fourth embodiment.

In the third embodiment, the toe angle target speed limiting unit 84B has been described with the functional block configuration shown in FIG. 11, but should not be limited to this. With reference to FIGS. 15 and 16, will be described an updating control (updating target value setting control) of the toe angle target value $\alpha_{T2B}$ with respect to the toe angle command value $\alpha_{T1}$ in the rear wheel steering control device according to the fourth embodiment.

FIGS. 15 and 16 are flowcharts indicating a flow of the updating control of the toe angle target value in the fourth embodiment.

The toe angle target speed limiting unit 84B in the fourth embodiment is a function provided by executing a program by a microcomputer of the controller 81B included in the toe angle changing control ECUs 37RB, 37LB as shown in FIG. 10. The updating control of the toe angle target value $\alpha_{T2B}$ is processed in the toe angle target speed limiting unit 84B at a predetermined period.

In the present embodiment, as similar to the third embodiment, to representatively describe the toe angle target speed limiting unit 84B for the toe angle changing control ECUs 37LB, 37RB, the toe angle command value $\alpha_{T1}$, the toe angle target value $\alpha_{T2B}$, the actual toe angle $\alpha_2$, an actual toe angle $\alpha_2$ subjected to the primary delay correction, the tracking error $\Delta\alpha_{T1B}$, the toe angle target value change quantity $\Delta\alpha_{T2}$ are referred. Regarding the toe angle changing control ECU 37LB, more specifically, a toe angle command value $\alpha_{TR1}$, an actual toe angle target value $\alpha_{T2PL}$, an acual toe angle subjected to the primary delay correction $\alpha_{2L}$, a tracking error $\Delta\alpha_{TL1B}$, a toe angle target changing quantity $\Delta\alpha_{TL2}$ are meant. Regarding the toe angle changing control ECU 37RB, more specifically, a toe angle command value $\alpha_{TR1}$, the toe angle target value $\alpha_{T2RB}$, an actual toe angle target value $\alpha_{T2PR}$, an actual toe angle subjected to the primary delay correction $\alpha_{2R}$, a tracking error $\Delta\alpha_{TR1B}$, a toe angle target changing quantity $\Delta\alpha_{TR2}$, are meant.

Steps S21 to S33 in the flowcharts in the fourth embodiment shown in FIGS. 15 and 16 substantially correspond to steps S01 to S13 in the flowchart in the second embodiment in which a step corresponding to the step S14 is deleted.

There is a difference other than the difference described above between the flow charts in the fourth embodiment and second embodiment is that "reading out the toe angle target value $\alpha_{T2P}$ at last outputted" in the step S02 is read as "reading out the actual toe angle $\alpha_{T1}$ to perform the primary delay correction as a corrected actual toe angle $\alpha_2$". "Tracking error $\Delta\alpha_{T1A}$" in the steps S03, S05, S07, S08, and S09 is read as "tracking error $\Delta\alpha_{T1B}$" in the steps S23, S25, S27, S28, and S29. "Last outputted toe angle target value $\alpha_{T2P}$" in the step S03 and S10 is read as "actual toe angle $\alpha_2$ subjected to the primary delay correction" in the step S23 and S30. "Toe angle target value $\alpha_{T2A}$" in the step S13 is read as "toe angle target value $\alpha_{T2B}$" in the step S33.

The step S24 in the flowcharts in FIGS. 15 and 16 corresponds to "command value increase and decrease direction determining means" in claims. Particularly, the steps S25 to S29 correspond to "target value speed limiting means for setting a first target value change quantity"; the steps S30 and S31 correspond to "during-steering direction-changing target value change quantity setting means"; the steps S26 and S30 correspond to "during-steering direction-changing neutral detection means"; the step S32 corresponds to "hold means"; and the step S33 corresponds to "output selecting means" and "target value setting updating means", respectively.

According to the embodiment, like the third embodiment, as shown in FIG. 14(a), when the toe angle target value $\alpha_{T2B}$ varies under setting and control as shown by the curve L4B having correspondence to the curve L1 showing the variation of the toe angle command value $\alpha_{T1}$, processing proceeds to the steps S30 an S31 at the time t2 and time t5, where the toe angle target changing quantity $\Delta\alpha_{T2}$ is determined as a predetermined value (maximum value) $\Delta\alpha_{max}$. In other words, the toe angle target value $\alpha_{T2B}$ can be varied at a maximum speed of the actuators 30L, 30R toward a neutral direction in which the toe angle command value $\alpha_{T1}$ varies. Accordingly, in the control of setting the toe angle target value $\alpha_{T2B}$, the steering direction change control is provided at earlier timing than the case of the prior art shown in FIG. 12. In addition, the actual toe angle $\alpha_1$ can be controlled in the steering angle change to track the toe angle target value $\alpha_{T2B}$ at the maximum speed corresponding to the steering direction change control of the toe angle command value $\alpha_{T1}$ in the target current calculating unit 86 (see FIG. 10). This eliminates a problem that the strange feeling is caused due to delay in the vehicle behavior because the variation in the toe angle command value $\alpha_{T1}$ becomes opposite to each other.

In addition, after the time t2 or the time t5 when the steering direction change control is started as shown in FIG. 14(a), when the actual toe angle $\alpha_1$ proceeds to and reaches the neutral position earlier than the toe angle command value $\alpha_{T1}$ (in a case of reaching the time t4B or the time t7B), processing proceeds from the step S30 to the step S32 where a value of the toe angle target value $\alpha_{T2B}$ is held as the toe angle target value change quantity $\Delta\alpha_{T2}=0$.

As described above, when there is steering direction change in the toe angle command value $\alpha_{T1}$, the processing proceeds from the step S30 to the step S31 where a quick response control of the actual toe angle $\alpha_1$ is provided as well as the processing proceeds to the step S32 from the step S30, which prevents overshooting across the neutral position though the actual toe angle $\alpha_1$ returning in the neutral direction prior to the toe angle command value $\alpha_{T1}$ occurs. In other words, it is prevented that the actual toe angle $\alpha_1$ tracks the toe angle target value $\alpha_{T2B}$ and overshoots up to the opposite direction to the left and right direction indicated by the toe angle command value $\alpha_{T1}$.

As a result, according to the embodiment, though the driver performs steering with such a quick steering direction change that a quick steering direction change output in the toe angle command value $\alpha_{T1}$ is caused (more specifically, toe angle command value $\alpha_{T1L}$, $\alpha_{T1R}$), the rear wheel steering control device capable of causing not strange feeling due to delay of the vehicle behavior can be provided.

<Modification>

It is not limited to the first to fourth embodiment of the present invention, but various modifications are provided as follows:

(1) The rear wheel steering control device according to the first to fourth embodiments have configurations, having two toe angle changing units 120L and 120R (see FIG. 1), being capable of changing the respective toe angle of rear wheels independently between left and right wheels. However, this is not limited to this, but may include a rear wheel steering control device for steering the rear wheels 1L and 2R (see FIG. 1) in the same direction with one actuator. In that case, the rear wheel steering device has one rear wheel toe angle device in place of the above-described rear wheel toe angle devices 120L and 120R, and the rear wheel toe angle device can be provided with a configuration having one toe angle changing control ECU.

(2) In place of the steering angle $\theta_H$ used in the toe angle command value operating unit 71 in the first to fourth embodiments, as shown by a box illustrated with the broken line, the front wheel steering angle detection sensor $S_{FS}$ (front wheel turning conditional quantity acquiring means) may be provided and used to detect the front wheel steering angle $\delta$, and also in the target current calculating unit 86, the target current value may be calculated with the front wheel steering angle $\delta$.

(3) The first to fourth embodiments have such configurations that the left and right toe angle change unit 120L, 120 have independent toe angle change control ECUs 37LA (37LB), 37RA (37RB), and the steering control ECUs 130 are also independently provided. However, there is no limit.

(3a) A part of the configuration of the CPUs for these three ECU functions may be provided with one CPU.

(3b) In addition, a part of the configuration of the CPUs for these two toe angle changing control ECUs 37LA (120LB), 37RA (12ORB) functions may be provided with one CPU.

(4) the electric power steering device 110 for outputting signals to the rear wheel steering control device according to the first to fourth embodiments includes those of steer by wire type in which the steering wheel 3 is mechanically separated from the front wheels 1L, 1R.

DESCRIPTION OF REFERENCE CODE 1L, 1R Front wheels
2L, 2R Left and right rear wheels
Steering wheel
30L, 30R Actuators
37LA, 37RA, 37LB, 37RB Toe angle changing control ECUs
Stroke sensor
51A, 51B Subtracters
Constant value outputting unit
Minimum value selecting unit
Fixed gain calculating unit
Maximum value selecting unit
56A, 56B Steering direction change controllers
57A, 57B Hold controller (target value setting updating unit)
58A Adder (target value setting updating unit, target value updating unit)

61 Tracking error sign determining unit (target value setting updating unit, during-steering direction-changing target value change quantity setting unit)
62 Toe angle command value differentiating unit (command value increase decrease direction determining unit)
63 Toe angle command value speed sign determining unit (command value increase and decrease direction determining unit)
64, 65 Multipliers (target value setting updating unit, during-steering direction-changing target value change quantity setting unit)
66 Two value selecting unit (target value setting updating unit, output selecting unit)
71 Toe angle command value operating unit (steering angle command value calculating unit, control unit)
73 Toe angle command value sign determining unit (during-steering direction-changing neutral detecting unit)
74A Target toe angle sign determining unit (during-steering direction-changing neutral detecting unit)
74B Actual toe angle sign determining unit (during-steering direction-changing neutral detecting unit)
75 Multiplier (during-steering direction-changing neutral detecting unit)
76, 78 Fixed value outputting units (during-steering direction-changing neutral detecting unit)
77 Sign matching determining unit (during-steering direction-changing neutral detecting unit)
79 Sign inconsistency determining unit (during-steering direction-changing neutral detecting unit)
81A, 81B Controllers
84A, 84B Toe angle target speed limiting unit (toe angle target speed limiting unit)
91 Fixed value outputting units (holding unit)
92 Two value selecting unit
120L, 120R Toe angle changing unit (rear wheel steering control device)
130 Steering control unit
$S_{FS}$ Steering angle sensor
$S_H$ Steering angle sensor

The invention claimed is:

1. A rear wheel steering control device comprising an actuator configured to change a steering angle of a rear wheel installed in a vehicle and a control unit configured to control driving the actuator, capable of changing a steering angle of the rear wheel, wherein:
the control unit comprises:
an actuator control unit configured to control the actuator;
a steering angle command value calculating unit configured to calculate a steering angle command value of the rear wheel on the basis of at least a turning state quantity of a front wheel;
a target value setting updating unit configured to perform a target value updating control by setting a steering angle target value of the rear wheel inputted into the actuator control unit in response to the value of the steering command value of the rear wheel inputted from the steering angle command calculating unit; and
a command value increase and decrease direction determining unit configured to determine an increase and decrease direction of the calculated steering angle command of the rear wheel, wherein
the target value setting updating unit calculates a difference between the steering angle command value of the rear wheel and the steering angle target value of the rear wheel last set as well as limits the calculated target value change quantity to be equal to or lower than a predetermined maximum value and is added to the steering angle target value of the rear wheel last set as a new steering angle target value of the rear wheels; and
when the command value increase and decrease direction determining unit detects that the increase and decrease direction of the steering angle command value of the rear wheel changes, the command value increase and decrease direction determining unit sets the target value change quantity in a direction opposite to the action of the actuator and to a predetermined maximum value to have a maximum speed, which is added to the steering angle target value of the rear wheel last set to conduct a target value updating control.

2. The rear wheel steering control device as claimed in claim 1, wherein after the target value setting updating unit starts the target value updating control by detecting change in the increase and decrease direction of the steering angle command value of the rear wheel, when the steering angle target value of the rear wheel reaches a neutral position, when the inputted steering angle command value of the rear wheel has not reached a neutral position, the target value setting updating unit sets the steering angle target value of the rear wheel to hold the steering angle target value of the rear wheel at the neutral position for the target value updating control.

3. A rear wheel steering control device comprising an actuator configured to change a steering angle of a rear wheel installed in a vehicle and a control unit configured to control driving the actuator, capable of changing a steering angle of the rear wheel, wherein:
the control unit comprises:
an actuator control unit configured to control the actuator;
a command value calculating unit configured to calculate a steering angle command value of the rear wheel on the basis of at least a turning state quantity of a front wheel;
a target value speed limiting unit configured to receive an input of a turning command value of the rear wheel inputted from the command value calculating unit and set a first target value change quantity limited to or lower than a predetermined maximum value so that the actuator can track;
a command value increase and decrease direction determining unit configured to determine an increase and decrease direction of the calculated turning command value of the rear wheel;
a during-steering direction-changing target value change quantity setting unit configured to set a second target value change quantity to the predetermined maximum value to have a new changed increase and decrease direction when the command value increase and decrease direction determining unit detects a change in the increase and decrease direction;
an output selecting unit configured to output either of the first target value change quantity inputted from the target value speed limiting unit or the second target value change quantity inputted from the during-steering direction-changing target value change quantity setting unit as a target value change quantity; and
a target value setting updating unit configured to add the target value change quantity inputted from the output selecting unit to a last steering angle target value of the rear wheel and output a result to the actuator control unit as a new steering angle target value of the rear wheel, wherein
when a tracking error, which is a difference between the inputted steering angle command value of the rear wheel and the last set steering angle target value of the rear wheel exceeds a predetermined maximum value, the target value speed limiting unit limits the first target value change quantity to the predetermined maximum value, and outputs the tracking error as the first target value change quantity when the tracking error does not exceed the predetermined maximum value;

when the command value increase and decrease direction determining unit detects a change in the decrease and increase direction of the steering angle command value of the rear wheel, the output selecting unit selects and outputs the second target change quantity as the target value change quantity; and the target value setting updating unit adds the target value change quantity inputted from the output selecting unit to the last steering angle target value of the rear wheel, outputting a result to the actuator control unit as a new steering angle target value of the rear wheel.

4. The rear wheel steering control device as claimed in claim 3, wherein the control unit further comprises:

a during-steering direction-changing neutral detecting unit configured to detect that the steering angle target value reaches a neutral position after the output selecting unit selects and outputs the second target change quantity as the target value change quantity when the command value increase and decrease direction determining unit detects a change in the increase and decrease direction; and a holding unit configured to replace the steering angle target value change quantity with zero, wherein the target value setting updating unit causes the holding unit to replace the steering angle target value change quantity with zero, adds the steering angle target value change quantity to the last steering angle target value of the rear wheel, and outputs the result as a new steering angle target value to the actuator control unit when the during-steering direction-changing neutral detecting unit detects that the steering angle target value reaches the neutral position after the output selecting unit selects and outputs the second target change quantity as the target value change quantity.

5. A rear wheel steering control device comprising actuators configured to respectively, independently change steering angles of left and right rear wheels installed in a vehicle and a control unit configured to control driving the respective actuators, capable of changing toe angles of the left and right rear wheels independently, wherein:

the control unit comprises:

an actuator control unit configured to independently control the respective actuators;

a toe angle command value calculating unit configured to calculate toe angle command values of the left and right rear wheels on the basis of at least a turning state quantity of a front wheel;

a target value setting updating unit configured to set respective toe angle target values of the left and right rear wheels in accordance with respective toe angle command values of the left and right rear wheels inputted from the toe angle command value calculating unit to perform a target value updating control, and a command value increase and decrease direction determining unit configured to determine increase and decrease directions of the respective inputted toe angle command values of the left and right rear wheels, wherein the target value setting updating unit performs the target value updating control respectively and independently between the left and right rear wheels for two sets including: the toe angle command value of the left rear wheel and last set toe angle target values of the left rear wheel; and the toe angle command value of the right rear wheel and last set toe angle target values of the right rear wheel by:

calculating differences between the toe angle command values of the rear wheels and the last set toe angle target values of the rear wheels as target value change quantities as well as limiting the calculated target value change quantities to or lower than a predetermined maximum value which is added to the last set toe angle target values, and setting the results as new toe angle target value of the left and right rear wheels; and when the command value increase and decrease direction determining unit detects that either of the increase and decrease directions of the toe angle command values of the left and right rear wheels, for the rear wheel of which the increase and decrease direction setting changes, setting the toe angle target value change quantity of the rear wheel of which the increase and decrease direction setting changes to the predetermined maximum value to have a maximum speed, which is added to the last set toe angle target value of the rear wheels of which the increase and decrease direction setting changes.

6. The rear wheel steering control device as claimed in claim 5, wherein after start of the target value updating control in response to the command value increase and decrease direction determining unit detecting that the increase and decrease direction of either of the toe angle command values of the left and right rear wheels changes, when the inputted toe angle command value of said rear wheel is detected to have not reached a neutral position, at time when the toe angle target value of said rear wheel reaches the neutral position, the target value setting updating unit sets the toe angle target value of said rear wheel to hold the toe angle target value of said rear wheel at the neutral position to perform the target value updating control.

7. A rear wheel steering control device comprising an actuator configured to change a steering angle of a rear wheel installed in a vehicle and a control unit configured to control driving the actuator, capable of changing a steering angle of the rear wheel, wherein:

the control unit comprises:

an actuator control unit configured to control the actuator;

a steering angle command value calculating unit configured to calculate a steering angle command value of the rear wheel on the basis of at least a turning state quantity of a front wheel;

a rear wheel actual steering angle acquiring unit configured to acquire information regarding an actual steering angle of the rear wheel;

a target value setting updating unit configured to set a steering angle target value of the rear wheel inputted into the actuator control unit in accordance with the steering angle command value of the rear wheel inputted from the steering commend value calculating unit to perform a target value updating control; and a command value increase and decrease direction determining unit configured to determine an increase and decrease direction of the calculated steering angle command value of the rear wheel, wherein the target value setting updating unit performs the updating target value updating control by:

calculating a difference between the steering angle command value of the rear wheel and the actual tuning angle acquired by the rear wheel actual steering angle acquiring unit as a target value change quantity as well as limiting the calculated target value change quantity to or lower than a predetermined maximum value, and adding the result to the actual steering angle value, which is set as a new steering angle target value of the rear wheel, wherein when detecting that an increase and decrease direction of the toe angle command value of the rear wheel, the command value increase and decrease direction determining unit sets the target value change quantity to a predetermined maximum value to make an action of the actuator at a maximum speed in a direction opposite to that by then, which is added to the actual steering angle.

8. The rear wheel steering control device as claimed in claim 7, wherein after start of the target value updating control in response to the command value increase and decrease direction determining unit detecting that the increase and decrease direction of either of the toe angle command values of the left and right rear wheels changes, when the inputted toe angle command value of the rear wheel is detected to have not reached a neutral position, at time when the toe angle target value of the rear wheel reaches the neutral position, the target value setting updating unit sets the toe angle target value of the rear wheel to hold the toe angle target value of the rear wheel at the neutral position to perform the target value updating control.

9. A rear wheel steering control device including actuators configured to respectively, independently change steering angles of left and right rear wheels installed in a vehicle and a control unit configured to control driving the actuators, capable of changing toe angles of the left and right rear wheels independently, wherein the control unit comprises:

an actuator control unit configured to independently control the respective actuators;

a toe angle command value calculating unit configured to control toe angle command values of the left and right rear wheels on the basis of at least a turning state quantity of a front wheel;

an actual toe angle information acquiring unit configured to acquire information regarding an actual toe angle of the left and right rear wheels;

a target value setting updating unit configured to set toe angle target values of the left and right rear wheels in accordance with toe angle command values of the left and right rear wheels inputted from the toe angle command value calculating unit to perform a target value updating control, and a command value increase and decrease direction determining unit configured to determine increase and decrease directions of the respective inputted toe angle command values of the left and right rear wheels, wherein the target value setting updating unit performs the target value updating control respectively and independently between the left and right, for two sets including: the toe angle command value of the left rear wheel and the actual toe angle of the left rear wheel by acquired by the actual toe angle information acquiring unit; and the toe angle command value of the right rear wheel and the toe angle target values of the right rear wheel acquired by the actual toe angle information acquiring unit by:

calculating a difference between the toe angle command values of the rear wheels and the actual toe angle target values of the rear wheels as a target value change quantity as well as limiting the calculated target value change quantity to or lower than a predetermined maximum value which is added to the last set toe angle target values, and setting the results as a new toe angle target value of the left and right rear wheels; and when the command value increase and decrease direction determining unit detects that either of the increase and decrease directions of the toe angle command values of the left and right rear wheels, for said rear wheel of which the increase and decrease direction setting changes, setting the toe angle target value change quantity of said rear wheel to the predetermined maximum value to have a maximum speed, and adding the predetermined maximum value to the actual toe angle of said rear wheels.

10. The rear wheel steering control device as claimed in claim 9, wherein after start of the target value updating control in response to the command value increase and decrease direction determining unit detecting that the increase and decrease direction of either of the toe angle command values of the left and right rear wheels changes, when the inputted toe angle command value of the rear wheel is detected to have not reached a neutral position, at time when the toe angle target value of the rear wheel reaches the neutral position, the target value setting updating unit sets the toe angle target value of the rear wheel to hold the toe angle target value of the rear wheel at the neutral position to perform the target value updating control.

* * * * *